United States Patent
Umeyama

(10) Patent No.: US 11,184,551 B2
(45) Date of Patent: Nov. 23, 2021

(54) IMAGING APPARATUS AND CONTROL METHOD THEREOF

(71) Applicant: CANON KABUSHIKI KAISHA, Tokyo (JP)

(72) Inventor: Manabu Umeyama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/676,001

(22) Filed: Nov. 6, 2019

(65) Prior Publication Data

US 2020/0145570 A1 May 7, 2020

(30) Foreign Application Priority Data

Nov. 7, 2018 (JP) .............................. JP2018-209754
Dec. 21, 2018 (JP) .............................. JP2018-239362
Feb. 27, 2019 (JP) .............................. JP2019-033958

(51) Int. Cl.
  *H04N 5/235* (2006.01)
  *H04N 5/91* (2006.01)

(52) U.S. Cl.
  CPC .............. *H04N 5/2351* (2013.01); *H04N 5/91* (2013.01)

(58) Field of Classification Search
  CPC ........ H04N 5/2351; H04N 5/91; H04N 5/783; H04N 9/8205; H04N 5/232; H04N 5/147; H04N 19/142; H04N 19/179; H04N 19/87
  See application file for complete search history.

(56) References Cited

U.S. PATENT DOCUMENTS

| | | | | |
|---|---|---|---|---|
| 2008/0266457 A1* | 10/2008 | Sasakura | ................ | G11B 27/28 348/572 |
| 2008/0313152 A1* | 12/2008 | Yoon | ..................... | G06F 16/783 |
| 2010/0253801 A1* | 10/2010 | Konishi | ............... | G11B 27/034 348/222.1 |
| 2011/0099199 A1* | 4/2011 | Stalenhoef | .............. | G06F 16/51 707/770 |
| 2011/0109758 A1* | 5/2011 | Liang | ..................... | H04N 19/46 348/222.1 |
| 2011/0261255 A1* | 10/2011 | Nagata | ................. | H04N 7/0122 348/441 |
| 2015/0078730 A1* | 3/2015 | Ueda | ..................... | G11B 27/309 386/241 |
| 2015/0256846 A1* | 9/2015 | Hattori | ................... | H04N 19/46 375/240.16 |
| 2016/0124991 A1* | 5/2016 | Kamphenkel | ......... | G06F 16/185 707/822 |

(Continued)

FOREIGN PATENT DOCUMENTS

WO      2015/017314 A1    2/2015

*Primary Examiner* — Timothy J Henn
(74) *Attorney, Agent, or Firm* — Cowan, Liebowitz & Latman P.C.

(57) ABSTRACT

An imaging apparatus according to the present invention includes: an image sensor configured to capture a moving image, and at least one memory and at least one processor which function as: a determining unit configured to determine a plurality of scenes of the moving image on a basis of a time variation of a parameter corresponding to a frame of the moving image; an acquiring unit configured to acquire a characteristic amount of each of the plurality of scenes; and a generating unit configured to generate information in which a characteristic amount acquired by the acquiring unit is associated with each of the plurality of scenes.

17 Claims, 26 Drawing Sheets

(56) References Cited

U.S. PATENT DOCUMENTS

| | | | |
|---|---|---|---|
| 2016/0254028 A1* | 9/2016 | Atkins | G11B 27/3027 |
| | | | 386/241 |
| 2018/0166102 A1* | 6/2018 | Newman | H04N 5/77 |
| 2019/0042874 A1* | 2/2019 | Possos | G06N 5/003 |
| 2019/0295454 A1* | 9/2019 | Urabe | G09G 3/3611 |

* cited by examiner

MOVING IMAGE DATA A

IMAGING APPARATUS AND CONTROL METHOD THEREOF

BACKGROUND OF THE INVENTION

Field of the Invention

The present invention relates to an imaging apparatus and a control method thereof.

Description of the Related Art

In recent years, techniques for determining a tone map using metadata (static metadata) indicating a maximum brightness of an entire moving image and performing HDR (high dynamic range) display in accordance with the maximum brightness of the entire moving image are widely used. In addition, techniques for sequentially (on a per-frame or per-scene basis) changing a display method of a moving image using metadata (dynamic metadata) including a maximum brightness of each frame or each scene of the moving image are becoming widespread. Specifically, techniques are emerging which, by sequentially changing a tone map (a tone curve) using dynamic metadata, sequentially changes HDR (high dynamic range) display in accordance with an upper limit display brightness, a maximum brightness of a frame or a scene of a moving image, or the like. WO 2015/017314 discloses a method of generating metadata (a part of dynamic metadata) of each scene of a moving image and adding the metadata to moving image data in a post-production image data editing process. WO 2015/017314 also discloses a technique used when dividing one moving image (moving image data) into a plurality of moving images (moving image data) in a post-production image data editing process for generating and adding static metadata and dynamic metadata with respect to each of a plurality of moving image data.

However, with the technique disclosed in WO 2015/017314, when there is no post-production (an image data editing process), an inability to obtain dynamic metadata makes it difficult to sequentially change the display method (HDR display using tone mapping or the like) of a moving image. In addition, since the technique disclosed in WO 2015/017314 is a technique applied when dividing a moving image, even by using the technique disclosed in WO 2015/017314 when connecting a plurality of moving images, it is difficult to generate and add static metadata suitable for moving image data after the connection. Furthermore, it is difficult to generate and add, with respect to moving image data expected to be connected (moving image data prior to connection), suitable static metadata (static metadata expected to be connected).

SUMMARY OF THE INVENTION

The present invention provides a technique that enables dynamic metadata and the like (a characteristic amount of each scene) to be acquired without involving post-production.

An imaging apparatus according to the present invention includes: an image sensor configured to capture a moving image, and at least one memory and at least one processor which function as: a determining unit configured to determine a plurality of scenes of the moving image on a basis of a time variation of a parameter corresponding to a frame of the moving image; an acquiring unit configured to acquire a characteristic amount of each of the plurality of scenes; and a generating unit configured to generate information in which a characteristic amount acquired by the acquiring unit is associated with each of the plurality of scenes.

Further features of the present invention will become apparent from the following description of exemplary embodiments with reference to the attached drawings.

DESCRIPTION OF THE EMBODIMENTS

First Embodiment

Figure 1:
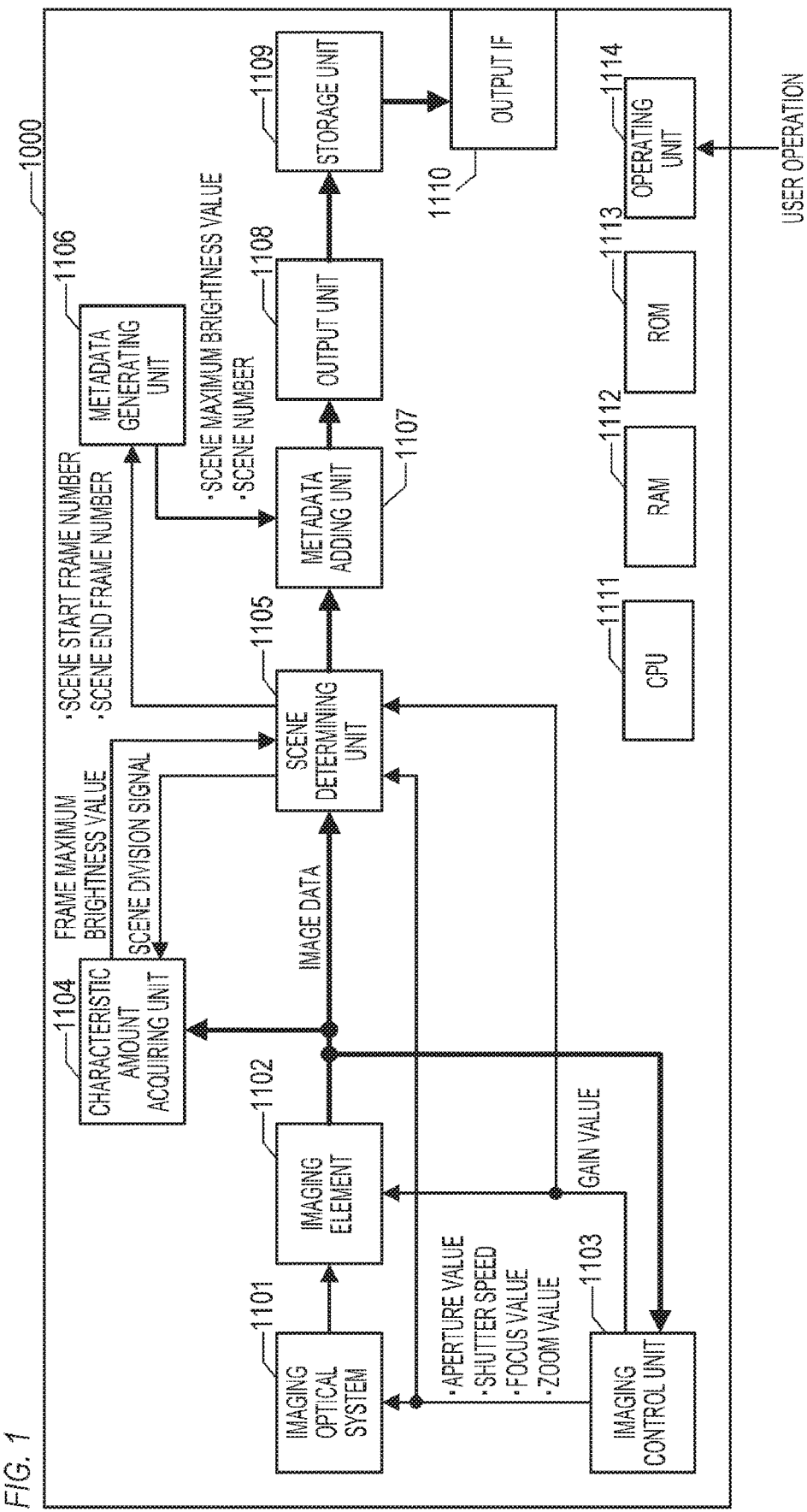
FIG. 1 is a block diagram showing a configuration example of an imaging apparatus according to a first embodiment.

Hereinafter, a first embodiment of the present invention will be described. FIG. 1 is a block diagram showing a configuration example of an imaging apparatus 1100 according to the present embodiment. The imaging apparatus 1100 includes an imaging optical system 1101, an imaging element 1102, an imaging control unit 1103, a characteristic amount acquiring unit 1104, a scene determining unit 1105, a metadata generating unit 1106, a metadata adding unit 1107, an output unit 1108, a storage unit 1109, an output IF 1110, a CPU 1111, a RAM 1112, a ROM 1113, and an operating unit 1114.

The imaging optical system 1101 forms an optical image representing an object on the imaging element 1102. For example, the imaging optical system 1101 includes a lens group such as a zoom lens and a focusing lens, an aperture adjusting device, and a shutter device.

The imaging element 1102 captures an object image (a moving image representing the object). Specifically, the imaging element 1102 performs a photoelectric conversion process in which a captured optical image (light incident from the object via the imaging optical system 1101) is converted into an analog electrical signal. In addition, the imaging element 1102 further performs an AD conversion process of converting the analog electrical signal obtained by the photoelectric conversion process into a digital electrical signal (image data of one frame of a moving image; frame image data). Subsequently, the imaging element 1102 outputs the frame image data obtained by the AD conversion process to the characteristic amount acquiring unit 1104 and the scene determining unit 1105. By repeating these processes, the imaging element 1102 sequentially outputs a plurality of frame image data respectively corresponding to a plurality of frames of a moving image.

The imaging control unit 1103 controls imaging conditions of the imaging apparatus 1100. In the present embodiment, the imaging control unit 1103 controls exposure (exposure conditions) of the imaging apparatus 1100 in accordance with a user operation with respect to the imaging apparatus 1100, a state of the imaging apparatus 1100, and the like. For example, the imaging control unit 1103 controls exposure by controlling aperture, a charge accumulation time of the imaging element, or the like. Specifically, the imaging control unit 1103 controls exposure by controlling a state of the imaging optical system 1101, processing by the imaging element 1102, or the like in accordance with a gain value, a shutter speed, an aperture value, or the like designated by a user. Furthermore, the imaging control unit 1103 controls focusing of the imaging apparatus 1100 in accordance with a user operation with respect to the imaging apparatus 1100, a state of the imaging apparatus 1100, and the like. For example, the imaging control unit 1103 controls focusing by controlling a drive amount, a drive direction, or the like of the focusing lens. Specifically, when an AF (automatic focusing) photography mode is being set, the imaging control unit 1103 adjusts the focusing lens to a predetermined position and calculates a shape (a distribution) of contrast of a frame image (an image of one frame of a moving image). Subsequently, the imaging control unit 1103 performs AF control by adopting a position where the contrast is highest among a plurality of positions in the frame image as a position (a focusing position) where a luminous flux is to be brought into focus in the imaging element 1102.

The characteristic amount acquiring unit 1104 acquires a characteristic amount (a frame characteristic amount) of frame image data output from the imaging element 1102. Specifically, the characteristic amount acquiring unit 1104 acquires, as a frame characteristic amount, a characteristic amount for determining a plurality of scenes of a moving image and a characteristic amount for acquiring a characteristic amount (a scene characteristic amount) of each scene. The frame characteristic amount can also be described a "parameter corresponding to a frame". In the present embodiment, the characteristic amount acquiring unit 1104 acquires a maximum brightness value (a frame maximum brightness value) of frame image data from the frame image data and outputs the frame maximum brightness value to the scene determining unit 1105. The frame maximum brightness value is used as both a characteristic amount for determining a plurality of scenes and a characteristic amount for acquiring a scene characteristic amount.

The scene determining unit 1105 performs a scene determination process of determining a plurality of scenes of a moving image. The scene determination process can also be described a "scene division process of dividing an entire period of a moving image into a plurality of periods". A frame characteristic amount often varies (significantly) during a scene change. In consideration thereof, in the present embodiment, the scene determining unit 1105 determines a plurality of scenes on the basis of a time variation of a frame characteristic amount (a frame maximum brightness value) output from the characteristic amount acquiring unit 1104. The time variation of a frame characteristic amount can also be described a "variation in the frame characteristic amount between time-sequential frames". The scene determining unit 1105 outputs a result of the scene determination process to the metadata generating unit 1106. In addition, the scene determining unit 1105 outputs, to the metadata generating unit 1106, the frame characteristic amount (the frame maximum brightness value) output from the characteristic amount acquiring unit 1104, and outputs, to the metadata adding unit 1107, the frame image data output from the imaging element 1102. Alternatively, the scene determining unit 1105 may perform various types of image processing with respect to the frame image data output from the imaging element 1102 and output the frame image data after the image processing to the metadata adding unit 1107. As the image processing, for example, a correction process of reducing distortion or noise attributable to the imaging optical system 1101 and the imaging element 1102 may be performed or white balance adjustment, a color conversion process, gamma correction, or the like may be performed.

The metadata generating unit 1106 generates information (dynamic metadata) to be added to moving image data (data of a moving image) and outputs the dynamic metadata to the metadata adding unit 1107. Specifically, the metadata generating unit 1106 acquires (determines) a scene characteristic amount of each scene of a moving image on the basis of information (a result of the scene determination process and a frame characteristic amount (a frame maximum brightness value) of each frame of the moving image) output from the scene determining unit 1105. Subsequently, the metadata generating unit 1106 generates information that associates the acquired scene characteristic amount to each scene as dynamic metadata.

The metadata adding unit 1107 generates moving image data made up of a plurality of frame image data sequentially output from the scene determining unit 1105 (the imaging element 1102), and adds the dynamic metadata output from the metadata generating unit 1106 to the moving image data. Subsequently, the metadata adding unit 1107 outputs the moving image data after adding the dynamic metadata thereto to the output unit 1108. For example, moving image data is data in a file format such as MPEG-4 AVC or HEVC (High Efficiency Video Coding), and the metadata adding unit 1107 performs an encoding process for obtaining moving image data in the file format. In addition, the metadata adding unit 1107 adds the dynamic metadata as SEI (Supplemental Enhancement Information) specified in MPEG-4 AVC or HEVC.

The output unit 1108 outputs, to the storage unit 1109, the moving image data output from the metadata adding unit 1107 (the moving image data after adding the dynamic metadata thereto). The output unit 1108 may individually output the moving image data and the dynamic metadata without having the metadata adding unit 1107 add the dynamic metadata to the moving image data. In this case, the metadata adding unit 1107 and the output unit 1108 may or may not output the moving image data and the dynamic metadata in association with each other.

The storage unit 1109 is a random-access recording medium such as a CF (compact flash) card, and stores the moving image data output from the output unit 1108 (the moving image data after adding the dynamic metadata thereto). The storage unit 1109 is detachable from the imaging apparatus 1100 and can be mounted to an apparatus other than the imaging apparatus 1100 (such as a personal computer). Alternatively, the storage unit 1109 may be an internal recording medium that is not attachable to and detachable from the imaging apparatus 1100.

The output IF 1110 outputs the moving image data stored by the storage unit 1109 (the moving image data after adding the dynamic metadata thereto) to an external apparatus (not illustrated). For example, the moving image data is output in a stream format in accordance with a communication protocol in compliance with the HDMI (registered trademark) (High-Definition Multimedia Interface) standard. It should be noted that methods of transmitting moving image data and dynamic metadata are not particularly limited. For example, a parameter specified in SMPTE (Society of Motion Picture & Television Engineers) ST 2094 may be transmitted as dynamic metadata. Specifically, Scene-Max-CLL (Maximum Content Light Level) specified in HDR10+ may be transmitted as dynamic metadata.

The CPU 1111 is connected via an internal bus (not illustrated) to other blocks of the imaging apparatus 1100. The CPU 1111 controls processing of the imaging apparatus 1100. The RAM 1112 is connected via the internal bus (not illustrated) to other blocks of the imaging apparatus 1100. The RAM 1112 is used as a work area of the CPU 1111 and a temporary storage area for temporarily storing various data. The ROM 1113 is connected via the internal bus (not illustrated) to other blocks of the imaging apparatus 1100. Firmware related to processing by the CPU 1111, information related to processing by the CPU 1111, and the like are recorded in the ROM 1113 in advance.

The operating unit 1114 is connected to the CPU 1111 via the internal bus (not illustrated). The operating unit 1114 is constituted by various operating members as an input unit for receiving user operations. The operating unit 1114 includes a photography start button for starting photography, a selector switch for switching between automatic control and manual control of focusing operations, and a focus ring for performing a focus adjustment operation. In addition, the operating unit 1114 includes a touch panel and a liquid crystal panel (both not illustrated) and causes displayed function icons to act as various function buttons. The function buttons include a photography start button, a moving image photography mode selection button, a white balance setting button, and an ISO sensitivity setting button. Moving image photography modes include a manual exposure photography mode, an automatic exposure photography mode, an MF (manual focusing) photography mode, an AF (automatic focusing) photography mode, a time-lapse photography mode, and a custom mode.

Figure 2:
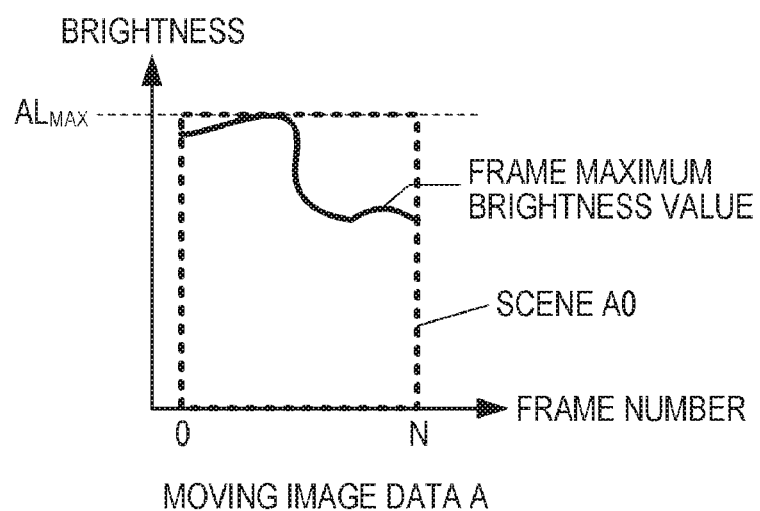
FIG. 2 is a diagram showing an example of a time variation of a frame maximum brightness value according to the first embodiment.

Next, an example of a photography process of the imaging apparatus 1100 will be described. FIG. 2 shows an example of a time variation of a frame maximum brightness value acquired by the characteristic amount acquiring unit 1104 in a case where the scene determination process by the scene determining unit 1105 is not performed. FIG. 2 shows an example in a case of obtaining moving image data A in which the number of a photography start frame (a frame obtained at the start of photography; a first frame of a moving image) is "0" and the number of a photography end frame (a frame obtained at the end of photography; a last frame of the moving image) is "N". In this case, an entire period of a moving image represented by the moving image data A is handled as a period of one scene A0, and both a maximum brightness value of the moving image data A and a maximum brightness value of the scene A0 equals a brightness value $AL_{MAX}$. Hereinafter, an example of a case where the moving image data A shown in FIG. 2 is obtained will be described as an example of a case where the scene determination process by the scene determining unit 1105 is performed.

FIGS. 3A to 3D show an example of a time variation of various parameters (a frame maximum brightness value, a period of a determined scene, a scene characteristic amount, and the like) during photography in order to obtain the moving image data A. In the present embodiment, it is assumed that a maximum value of a frame maximum brightness acquired with respect to one scene or, in other words, a maximum brightness value (a scene maximum brightness value) of the moving image data of the scene is acquired as a scene characteristic amount. In FIGS. 3A to 3D, "$Fr_{NOW}$" denotes a frame number (the number of a frame) of a frame image presently being photographed. "$AL_{MAX\_NOW}$" denotes a frame maximum brightness value of the frame $Fr_{NOW}$ (a frame with the frame number $Fr_{NOW}$) or, in other words, a maximum brightness value of the frame image presently being photographed. "An" in "$AnL_{MAX}$" denotes a scene number (the number of a scene), and "$AnL_{MAX}$" denotes a scene maximum brightness value of the scene An (a scene with the scene number An). A scene A1 refers to a scene that starts from a frame 0 (a photography start frame). The frame number is counted by the scene determining unit 1105. For example, the scene determining unit 1105 is equipped with a counter that is incremented every time frame image data is acquired and uses a value of the counter as the frame number. The scene number is counted by the metadata generating unit 1106. Details will be provided later.

Figure 4:
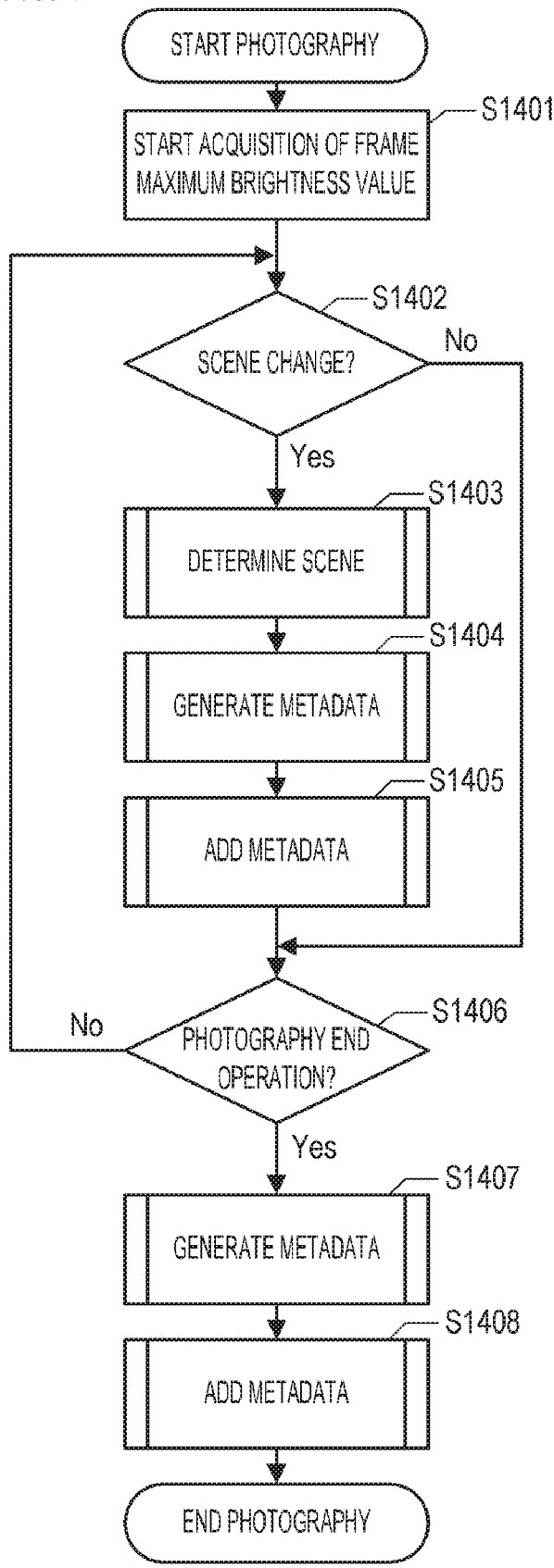
FIG. 4 is a flow chart showing an example of a photography process according to the first embodiment.

FIG. 4 is a flow chart showing an example of a photography process by the imaging apparatus 1100. The photography process shown in FIG. 4 includes a scene determination process and a dynamic metadata addition process (a process of adding dynamic metadata to moving image data). The photography process shown in FIG. 4 is started when the CPU 1111 detects that a photography start operation by the user has been received by the operating unit 1114 and realized by the CPU 1111 by controlling the respective blocks of the imaging apparatus 1100. For example, the photography start operation is a user operation in which the photography start button of the operating unit 1114 is depressed in a non-photographing state of the imaging apparatus 1100.

Figure 3A:
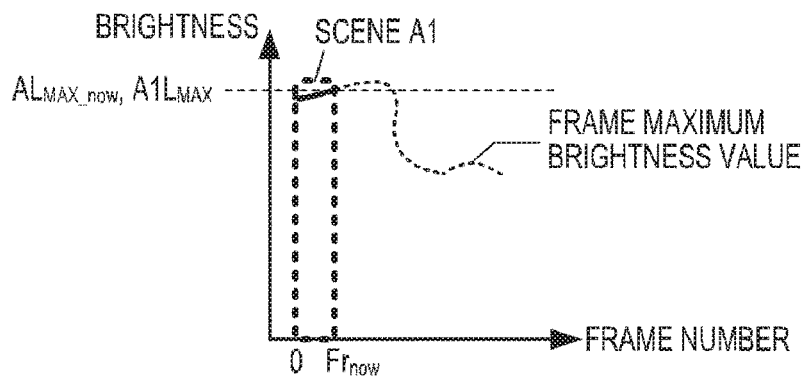
FIGS. 3A to 3D are diagrams showing an example of a time variation of various parameters during photography according to the first embodiment.

In S1401, the characteristic amount acquiring unit 1104 starts acquisition of a frame maximum brightness value $AL_{MAX\_NOW}$ of frame image data output from the imaging element 1102. The characteristic amount acquiring unit 1104 outputs the frame maximum brightness value $AL_{MAX\_NOW}$ to the scene determining unit 1105. In addition, when the frame maximum brightness value $AL_{MAX\_NOW}$ is higher than a scene maximum brightness value $AnL_{MAX}$ of the scene An including a frame with the frame number $Fr_{NOW}$, the characteristic amount acquiring unit 1104 records the frame maximum brightness value $AL_{MAX\_NOW}$ as the scene maximum brightness value $AnL_{MAX}$ in the RAM 1112. This process can be described a "process of updating the scene maximum brightness value $AnL_{MAX}$ recorded in the RAM 1112 with the frame maximum brightness value $AL_{MAX\_NOW}$". FIG. 3A shows a state where the frame maximum brightness value $AL_{MAX\_NOW}$ which is higher than a scene maximum brightness value $A1L_{MAX}$ (the scene maximum brightness value of a scene A1) is detected and the scene maximum brightness value $A1L_{MAX}$ is updated. When the frame $Fr_{NOW}$ is frame 0, the characteristic amount acquiring unit 1104 records the frame maximum brightness value $AL_{MAX\_NOW}$ as the scene maximum brightness value $A1L_{MAX}$ in the RAM 1112.

In S1402, the scene determining unit 1105 determines whether or not a scene change is to be performed in the frame $Fr_{NOW}$. This determination can also be described a "determination of whether or not a period of a moving image is to be divided in the frame $Fr_{NOW}$", a "determination of whether or not to determine (finalize) a scene", and the like. When it is determined that a scene change is not to be performed (S1402: No), the process is advanced to S1406. When it is determined that a scene change is to be performed (S1402: Yes), the process is advanced to S1403.

In S1403, the scene determining unit 1105 determines (finalizes) a period up to a frame $Fr_{NOW}-1$ preceding the frame $Fr_{NOW}$ as a period of a scene.

In the present embodiment, the processes of S1402 and S1403 are performed such that a scene change is not performed at a time position where the frame maximum brightness value does not vary but a scene change is performed at a time position where the frame maximum brightness value varies. For example, the processes of S1402 and S1403 are performed such that a scene change is not performed at a time position where the frame maximum brightness value varies in a variation amount that is smaller than a threshold but a scene change is performed at a time position where the frame maximum brightness value varies in a variation amount that is larger than the threshold. Specifically, in S1402, the scene determining unit 1105 compares the frame maximum brightness value $AL_{MAX\_NOW}$ of the frame $Fr_{NOW}$ with a frame maximum brightness value $AL_{MAX\_NOW-1}$ of the frame $Fr_{NOW}-1$. Subsequently, the processes of S1402 and S1403 are performed such that a scene change is not performed when a difference (an absolute difference) between the frame maximum brightness value $AL_{MAX\_NOW}$ and the frame maximum brightness value $AL_{MAX\_NOW-1}$ is smaller than a threshold but a scene change is performed when the difference is equal to or larger than the threshold. It should be noted that the threshold is not particularly limited. The threshold may be a fixed value set in advance or a value that can be changed by the user.

Figure 3B:
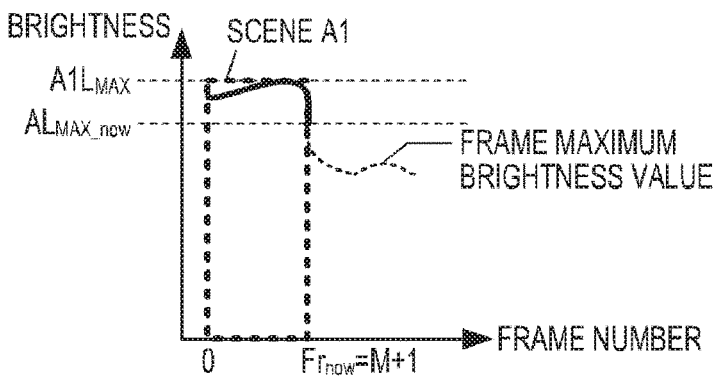

FIG. 3B shows a state where a scene has been determined (finalized) at a timing of a frame $Fr_{NOW}=M+1$. In the example shown in FIG. 3B, upon acquiring frame image data of a frame number M+1, the scene determining unit 1105 determines (finalizes) a period from the frame 0 to a frame M as a period of the scene A1. In addition, the scene determining unit 1105 outputs a scene start frame number (the number of a first frame of a scene) 0 of the scene A1 and a scene end frame number (the number of a last frame of a scene) M of the scene A1 to the metadata generating unit 1106. Furthermore, the scene determining unit 1105 outputs a scene determination signal indicating that a scene has been determined to the characteristic amount acquiring unit 1104.

Upon acquiring the scene determination signal, the characteristic amount acquiring unit 1104 changes an area of the RAM 1112 in which the scene maximum brightness value $AnL_{MAX}$ is recorded. Accordingly, the scene maximum brightness value of each scene is to be individually recorded in the RAM 1112. In the example shown in FIG. 3B, in a state where the scene maximum brightness value $A1L_{MAX}$ is recorded in a predetermined area of the RAM 1112, a recording area of a scene maximum brightness value $A2L_{MAX}$ is selected and the frame maximum brightness value $AL_{MAX\_NOW}$ is recorded in the RAM 1112 as the scene maximum brightness value $A2L_{MAX}$. Subsequently, when the frame maximum brightness value $AL_{MAX\_NOW}$ is higher than the scene maximum brightness value $A2L_{MAX}$, the scene maximum brightness value $A2L_{MAX}$ recorded in the RAM 1112 is updated with the frame maximum brightness value $AL_{MAX\_NOW}$.

In S1404, the metadata generating unit 1106 generates metadata (a part of dynamic metadata) of one scene from the scene start frame number and the scene end frame number acquired from the scene determining unit 1105 and the scene maximum brightness value acquired from the RAM 1112. The metadata of one scene includes a scene start frame number, a scene end frame number, a scene number, a scene maximum brightness value, and the like. For example, the scene determining unit 1105 is equipped with a counter that is incremented every time a scene start frame number and a scene end frame number are acquired and uses a value of the counter as a scene number. The counter may be incremented with an update of the scene end frame number acting as a trigger.

In the example shown in FIG. 3B, the metadata generating unit 1106 determines the scene number A1 and acquires the scene maximum brightness value $A1L_{MAX}$ in accordance with the acquisition of the scene start frame number 0 and the scene end frame number M. In addition, the metadata generating unit 1106 generates data in which the scene start frame number 0, the scene end frame number M, the scene number A1, and the scene maximum brightness value $A1L_{MAX}$ are associated with one another as the metadata of the scene A1. Subsequently, the metadata generating unit 1106 outputs the metadata of the scene A1 to the metadata adding unit 1107. Every time a scene start frame number and a scene end frame number are acquired, the metadata generating unit 1106 changes an area of the RAM 1112 from which a scene maximum brightness value is to be read. Accordingly, the metadata generating unit 1106 can read a scene maximum brightness value corresponding to a scene that is determined by a scene start frame number and a scene end frame number from the RAM 1112.

In S1405, the metadata adding unit 1107 adds the metadata (the metadata of one scene) acquired from the metadata generating unit 1106 to moving image data (moving image data of one scene) constituted by a plurality of frame image data sequentially output from the scene determining unit 1105. In the example shown in FIG. 3B, the metadata of the scene A1 is added to the moving image data of the scene A1. The moving image data after adding the metadata thereto is recorded in the storage unit 1109. In this case, it is assumed that metadata is added as the SEI of HEVC. In addition, as the moving image data after adding the metadata thereto, an HEVC file generated by an encoding process of HEVC is recorded in the storage unit 1109. Although details will be provided later, the processes of S1402 to S1406 may be repeated. In S1405 for second and subsequent times, with respect to a recorded moving image (a moving image recorded in S1405 in the past), a current moving image (a moving image of one scene) is coupled as a continuation (update of the recorded moving image).

Figure 3C:
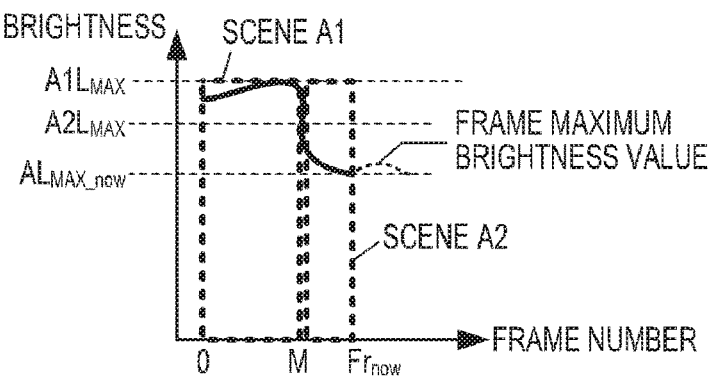

In S1406, the CPU 1111 determines whether or not the operating unit 1114 has received a photography end operation by the user. For example, the photography end operation is a user operation in which the photography end button of the operating unit 1114 is depressed in a photographing state of the imaging apparatus 1100. When it is determined that a photography end operation has not been performed (S1406: No), the process is returned to S1402 and the processes of S1402 to S1406 are repeated. FIG. 3C shows a state after the scene A1 is determine in a frame M+1. In FIG. 3C, "scene A2" represents a scene subsequent to the scene A1. In a similar manner to during the photography of the scene A1 (in the manner described above), the characteristic amount acquiring unit 1104 records the scene maximum brightness value $A2L_{MAX}$ of the scene A2 in the RAM 1112. When it is determined that a photography end operation has been performed (S1406: Yes), the process is advanced to S1407. When a photography end operation has been performed, the scene determining unit 1105 outputs the scene start frame number of a last scene (the last scene of a moving image) and the scene end frame number of the last scene (the number of a photography end frame; the number of the last frame of the moving image) to the metadata generating unit 1106.

In S1407, the metadata generating unit 1106 generates metadata (a part of dynamic metadata) of the last scene from the scene start frame number and the scene end frame number acquired from the scene determining unit 1105 and the scene maximum brightness value acquired from the RAM 1112.

Figure 3D:
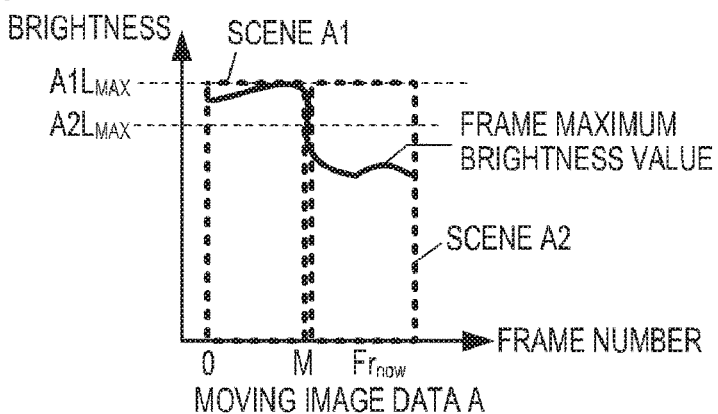

FIG. 3D shows a state where photography of an image of a photography end frame N has ended and acquisition of moving image data A has ended. In the example shown in FIG. 3D, the metadata generating unit 1106 determines a scene number A2 and acquires the scene maximum brightness value $A2L_{MAX}$ in accordance with the acquisition of a scene start frame number M+1 and a scene end frame number N. In addition, the metadata generating unit 1106 generates data in which the scene start frame number M+1, the scene end frame number N, the scene number A2, and the scene maximum brightness value $A2L_{MAX}$ are associated with one another as the metadata of the scene A2. Subsequently, the metadata generating unit 1106 outputs the metadata of the scene A2 to the metadata adding unit 1107.

In S1408, the metadata adding unit 1107 adds the metadata (the metadata of the last scene) acquired from the metadata generating unit 1106 to moving image data (moving image data of the last scene) constituted by a plurality of frame image data sequentially output from the scene determining unit 1105. In the example shown in FIG. 3D, the metadata of the scene A2 is added to the moving image data of the scene A2. The moving image data after adding the metadata thereto is recorded in the storage unit 1109. When the process of S1405 has been performed, with respect to a recorded moving image (a moving image recorded in S1405), a current moving image (a moving image of the last scene) is coupled as a continuation (update of the recorded moving image).

As described above, according to the present embodiment, in the imaging apparatus, a plurality of scenes are determined on the basis of a time variation of a frame maximum brightness value and a scene maximum brightness value of each of the plurality of scenes is acquired. In addition, information (dynamic metadata) which associates the scene maximum brightness value to each of the plurality of scenes is generated. In other words, dynamic metadata and the like can be acquired without involving post-production (an image data editing process). As a result, a display method of a moving image can be sequentially changed on the basis of dynamic metadata. For example, in HDR (high dynamic range) display using tone mapping, a tone map can be sequentially changed on the basis of dynamic metadata.

While an example of repeating a process of recording moving image data of a scene in the storage unit 1109 has been described with reference to FIG. 4, this example is not restrictive. For example, the metadata adding unit 1107 may add dynamic metadata to moving image data representing an entire moving image so that metadata is added to a portion of each scene upon completion of photography of the moving image, and record the moving image data after adding the dynamic metadata thereto in the storage unit 1109. In this case, the metadata adding unit 1107 temporarily records the acquired moving image data (a plurality of frame image data) and the metadata in the RAM 1112.

While an example of identifying a scene by a frame number has been described with reference to FIG. 4, this example is not restrictive. For example, a scene may be identified by a photography time or a photography time point. Specifically, a scene photography start time may be used in place of a scene start frame number and a scene photography end time may be used in place of a scene start end number. The scene photography start time is a time from a predetermined timing (a timing where photography of a moving image is started or the like) to a start of photography of a scene, and the scene photography end time is a time from the predetermined timing to an end of photography of the scene.

While an example of detecting a scene change from a variation in a frame maximum brightness value between consecutive frames has been described with reference to FIG. 4, a determination method of a scene is not limited thereto and a parameter for determining a scene is not limited to a frame maximum brightness value. A parameter for determining a scene may differ from a frame characteristic amount for acquiring a scene characteristic amount. For example, a parameter for determining a scene may be an average value of a frame maximum brightness value of a corresponding frame that is a frame corresponding to the parameter and a frame maximum brightness value of one or more frames that are time-sequential with respect to the corresponding frame. Specifically, the scene determining unit 1105 may record the frame maximum brightness value of the frame $Fr_{NOW}$ and the frame maximum brightness values of one or more time-sequential frames preceding the frame $Fr_{NOW}$ in the RAM 1112. In addition, the scene determining unit 1105 may determine a plurality of scenes so that a scene change is performed when the average value of the frame maximum brightness values varies in a variation amount that is larger than a threshold. Alternatively, the frame maximum brightness values of time-sequential frames subsequent to the frame $Fr_{NOW}$ may be used. One of the frame maximum brightness values of time-sequential frames preceding the frame $Fr_{NOW}$ and the frame maximum brightness values of time-sequential frames subsequent to the frame $Fr_{NOW}$ may be used, or the frame maximum brightness values of time-sequential frames both preceding and subsequent to the frame $Fr_{NOW}$ may be used. There may be a plurality of parameters (parameters of a plurality of types) for determining a scene.

A frame characteristic amount is not limited to a frame maximum brightness value and a scene characteristic amount is not limited to a scene maximum brightness value. For example, the frame characteristic amount may be another representative value (an average value, a minimum value, a mode, an intermediate value, or the like) or a histogram of a brightness value of frame image data. The scene characteristic amount may be another representative value (an average value, a minimum value, a mode, an intermediate value, or the like) of a frame characteristic amount acquired with respect to a scene. A representative value (a maximum value, an average value, a minimum value, a mode, an intermediate value, or the like) of a brightness value of scene moving image data (moving image data of a scene) may be acquired as scene characteristic amount from the scene moving image data instead of determining the scene characteristic amount from a frame characteristic amount. A frame characteristic amount of one frame or a scene characteristic amount of one scene may include a plurality of values (values of a plurality of types).

Second Embodiment

A second embodiment of the present invention will be described below. Hereinafter, points (configurations, processes, and the like) that differ from those of the first embodiment will be described in detail and descriptions of points that are the same as those of the first embodiment will be omitted. In the first embodiment, an example of using a frame maximum brightness value as a parameter for determining a scene has been described. An imaging parameter often varies during a scene change. In consideration thereof, in the present embodiment, an example of using an imaging parameter that is used when capturing a frame image as a parameter for determining a scene will be described. Specifically, an example of using an aperture value as a parameter for determining a scene in a manual exposure photography mode will be described.

The imaging apparatus according to the present embodiment has a similar configuration to the imaging apparatus 1100 shown in FIG. 1 (the first embodiment). However, the present embodiment differs from the first embodiment in the scene determination process by the scene determining unit 1105. Furthermore, in the present embodiment, the characteristic amount acquiring unit 1104 does not output a frame maximum brightness value to the scene determining unit 1105. Instead, the imaging control unit 1103 outputs an aperture value to the scene determining unit 1105. The imaging control unit 1103 may also output a gain value, a shutter speed, and the like to the scene determining unit 1105.

An example of a processing flow related to the scene determination process will be described. First, the operating unit 1114 receives a mode change operation (a user operation) for changing to the manual exposure photography mode. In accordance with the mode change operation, the CPU 1111 controls the respective blocks of the imaging apparatus 1100 and sets the manual exposure photography mode. Next, the operating unit 1114 receives a photography start operation. In accordance with the photography start operation, the CPU 1111 controls the respective blocks of the imaging apparatus 1100 and starts photography. Next, the operating unit 1114 receives an aperture variation operation (a user operation) for varying the aperture value. The imaging control unit 1103 changes a state of the imaging optical system 1101 in accordance with the aperture value after the variation and outputs the aperture value after the variation to the scene determining unit 1105. Next, the scene determining unit 1105 determines whether or not to determine (finalize) a scene in accordance with the acquired variation to the aperture value. In other words, the scene determining unit 1105 determines whether or not a scene change is to be performed at the present timing in accordance with the acquired variation to the aperture value.

Figure 5:
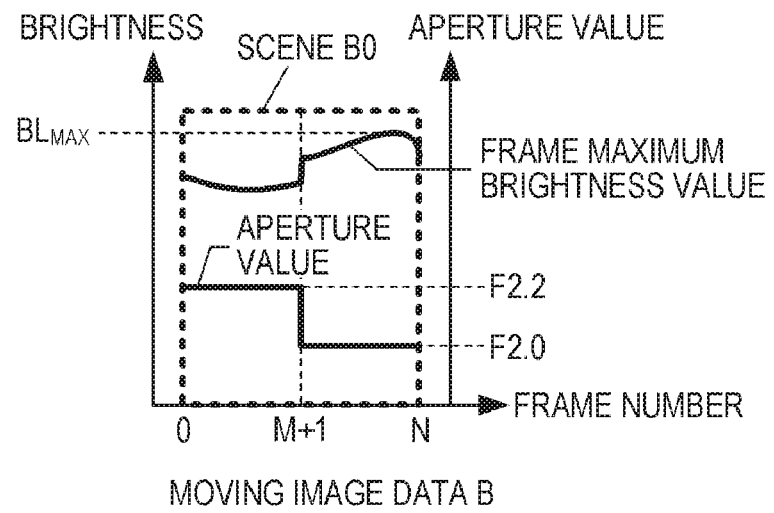
FIG. 5 is a diagram showing an example of a time variation of a frame maximum brightness value and an aperture value according to a second embodiment.

FIG. 5 shows an example of a time variation of a frame maximum brightness value and an aperture value in a case where the scene determination process by the scene determining unit 1105 is not performed. FIG. 5 shows an example in a case of obtaining moving image data B in which the number of a photography start frame is "0" and the number of a photography end frame is "N". In FIG. 5, upon photography of an image of a frame M+1, the aperture value is varied from F2.2 to F2.0. However, since the scene determination process is not performed, an entire period of a moving image represented by the moving image data B is handled as a period of one scene B0, and both a maximum brightness value of the moving image data B and a maximum brightness value of the scene B0 equal a brightness value $BL_{MAX}$. Hereinafter, an example of a case where the aperture value is varied in a similar manner to FIG. 5 and the moving image data B shown in FIG. 5 is obtained will be described as an example of a case where the scene determination process by the scene determining unit 1105 is performed.

Figure 6:
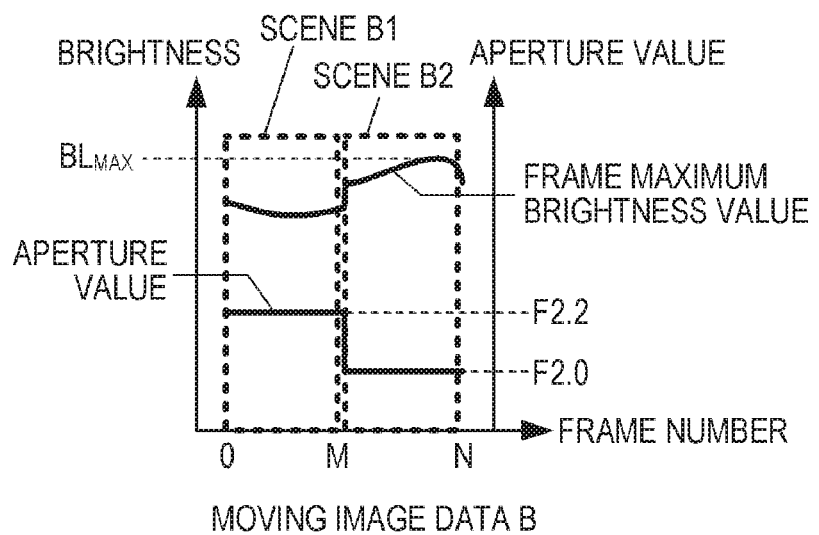
FIG. 6 is a diagram showing an example of a time variation of a frame maximum brightness value and an aperture value according to the second embodiment.

FIG. 6 shows an example of a time variation of a frame maximum brightness value and an aperture value in a case where the scene determination process by the scene determining unit 1105 is performed. In the present embodiment, the scene determining unit 1105 determines a plurality of scenes so that a scene change is performed at a time position where the aperture value varies. Therefore, as shown in FIG. 6, a period from the frame 0 to the frame M is determined as a period of a scene B1 and a period from the frame M+1 to the frame N is determined as a period of a scene B2. In addition, by a process similar to that according to the first embodiment, a brightness value $B1L_{MAX}$ is acquired as a scene maximum brightness value of the scene B1, a brightness value $B2L_{MAX}$ is acquired as a scene maximum brightness value of the scene B2, and dynamic metadata including the scene maximum brightness values $B1L_{MAX}$ and $B2L_{MAX}$ is generated.

As described above, according to the present embodiment, in the imaging apparatus, a plurality of scenes are determined on the basis of a time variation of an imaging parameter (an aperture value) and dynamic metadata is generated in a similar manner to the first embodiment. In other words, dynamic metadata and the like can be acquired without involving post-production. As a result, a display method of a moving image can be sequentially changed on the basis of dynamic metadata.

While an example where a manual exposure photography mode is set has been described, an automatic exposure photography mode in which an aperture value is automatically varied may be set instead. In the automatic exposure photography mode, the imaging control unit 1103 refers to frame image data acquired from the imaging element 1102 and automatically varies an aperture value (independent of a user operation). Even when the automatic exposure photography mode is set, a plurality of scenes can be determined on the basis of a time variation of the aperture value in a similar manner to when the manual exposure photography mode is set.

While an example in which a scene change is performed at a time position where the aperture value varies (even by a slightest amount) has been described, a scene change may be performed at a time position where the aperture value varies by a variation amount that is larger than a threshold. For example, control may be performed such that a scene change is not performed when the aperture value varies by less than one step (for example by ⅓ step) but a scene change is performed when the aperture value varies by one step or more.

An imaging parameter for determining a scene is not limited to an aperture value. For example, a plurality of scenes may be determined on the basis of a time variation of ISO sensitivity, a shutter speed, a focus position, a focal length, white balance, an exposure value, or the like. An exposure value can be calculated from ISO sensitivity, a shutter speed, and an aperture value. As an imaging parameter for determining a scene, an imaging parameter of one type may be used or imaging parameters of a plurality of types may be used.

When there are a plurality of parameters for determining a scene, the scene determining unit 1105 may determine a plurality of scenes using a parameter in accordance with a set photography mode among the plurality of parameters. For example, in the case of a photography mode in which ISO sensitivity is automatically set, a plurality of scenes may be determined on the basis of a time variation of the ISO sensitivity and not on the basis of a time variation of parameters other than the ISO sensitivity. In the case of a photography mode in which white balance is automatically set, a plurality of scenes may be determined on the basis of a time variation of the white balance and not on the basis of a time variation of parameters other than the white balance. In a similar manner, an aperture value may be used in the case of an aperture priority mode and a shutter speed may be used in the case of a shutter speed priority mode. In the case of a manual mode in which all of the imaging parameters are to be manually set, a plurality of scenes may be determined in consideration of all of the imaging parameters. At least one of a plurality of parameters may be designated by the user as a parameter for determining a scene.

Control may be performed so that the scene determination process is not performed (a plurality of scenes are not determined) when a specific photography mode is set. For example, control may be performed so as not to perform a scene change during a focus change in an AF photography mode since it is highly likely that an image of a same scene is being photographed and to perform a scene change during a focus change in an MF photography mode since intended image formation is being performed. Execution/non-execution of the scene determination process may be designated by the user regardless of the photography mode or the like.

A parameter for determining a scene, a method of switching between execution and non-execution of the scene determination process, a photography mode in which the scene determination process is to be executed (or not to be executed), and the like are not particularly limited.

Third Embodiment

A third embodiment of the present invention will be described below. Hereinafter, points (configurations, processes, and the like) that differ from those of the first embodiment will be described in detail and descriptions of points that are the same as those of the first embodiment will be omitted. In the present embodiment, an example of determining a scene and generating dynamic metadata in consideration of an in-focus region (a region inside a depth of field) of a frame image will be described. While a photography mode is not particularly limited, in the present embodiment, an example of the MF photography mode will be described.

Figure 7:
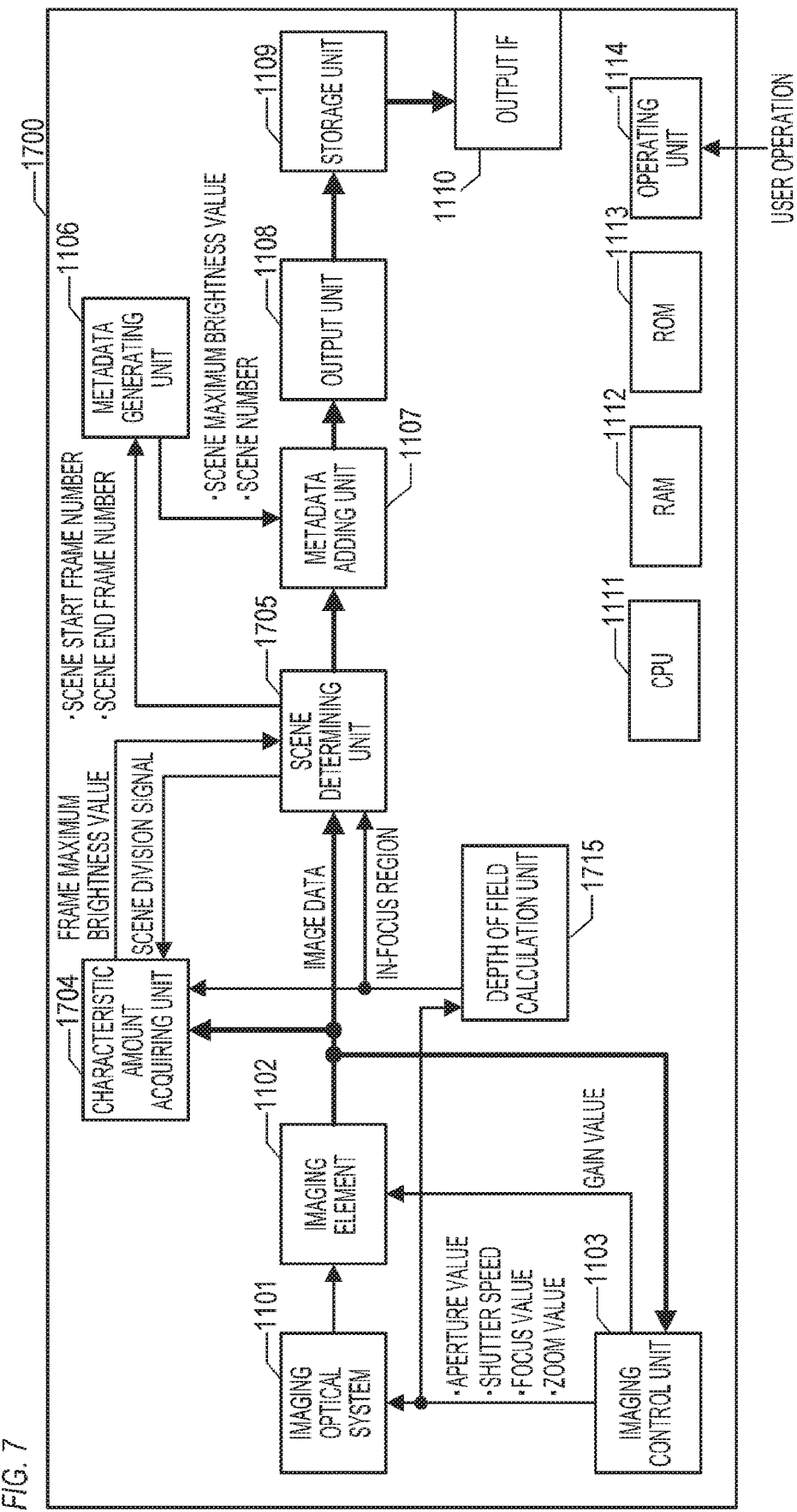
FIG. 7 is a block diagram showing a configuration example of an imaging apparatus according to a third embodiment.

FIG. 7 is a block diagram showing a configuration example of an imaging apparatus 1700 according to the present embodiment. In FIG. 7, same blocks as those shown in FIG. 1 (the first embodiment) are assigned same reference characters as in FIG. 1. The imaging apparatus 1700 includes a characteristic amount acquiring unit 1704 in place of the characteristic amount acquiring unit 1104 according to the first embodiment and includes a scene determining unit 1705 in place of the scene determining unit 1105 according to the first embodiment. In addition, the imaging apparatus 1700 includes a depth of field calculation unit 1715.

The characteristic amount acquiring unit 1704 has a similar function to the characteristic amount acquiring unit 1104 according to the first embodiment. However, the characteristic amount acquiring unit 1704 acquires, as a frame maximum brightness value, a maximum brightness value of image data corresponding to an in-focus region (a region inside a depth of field) of a frame image instead of a maximum brightness value of an entire of frame image data. The in-focus region (the region inside a depth of field) is notified by the depth of field calculation unit 1715. In a similar manner to the first embodiment, the frame maximum brightness value (a maximum brightness value of image data corresponding to the in-focus region) is used as both a characteristic amount for determining a plurality of scenes and a characteristic amount for acquiring a scene characteristic amount. It should be noted that a maximum brightness value of image data corresponding to the in-focus region may be acquired as a characteristic amount for determining a plurality of scenes and a maximum brightness value of an entire of frame image data may be acquired as a characteristic amount for acquiring a scene characteristic amount. Alternatively, the opposite may apply.

The scene determining unit 1705 has a similar function to the scene determining unit 1105 according to the first embodiment. However, when the frame maximum brightness value varies in a variation amount that is larger than a threshold, the scene determining unit 1705 determines whether or not to perform a scene change in consideration of a time variation of the in-focus region (the region inside a depth of field). The in-focus region (the region inside a depth of field) is notified by the depth of field calculation unit 1715.

The depth of field calculation unit 1715 acquires an aperture value, a focus value (a focus position), and a zoom value (a focal length) from the imaging control unit 1103. In other words, the imaging control unit 1103 outputs an aperture value, a focus value, and a zoom value to the depth of field calculation unit 1715. The depth of field calculation unit 1715 calculates a depth of field from the aperture value, the focus value, and the zoom value. In addition, the depth of field calculation unit 1715 notifies the characteristic amount acquiring unit 1704 and the scene determining unit 1705 of a region inside the depth of field of a frame image as the in-focus region.

An example of a processing flow related to the scene determination process will be described. First, the operating unit 1114 receives a mode change operation (a user operation) for changing to the MF photography mode. In accordance with the mode change operation, the CPU 1111 controls the respective blocks of the imaging apparatus 1700 and sets the MF photography mode. Next, the imaging control unit 1103 controls a state of the imaging optical system 1101, processing of the imaging element 1102, or the like in accordance with an aperture value, a shutter speed, a focus value, a zoom value, and the like. In addition, the imaging control unit 1103 outputs the aperture value, the focus value, and the zoom value to the depth of field calculation unit 1715.

Subsequently, the depth of field calculation unit 1715 calculates a depth of field from the aperture value, the focus value, and the zoom value acquired from the imaging control unit 1103. For example, the depth of field is calculated using Expression 1 below.

[Math. 1]

$$\text{Depth of field} = \frac{\text{aperture value} \times \text{focus value}^2}{\text{zoom value}^2 \pm \text{aperture value} \times \text{focus value}} \quad \text{(Expression 1)}$$

Next, on the basis of frame image data acquired from the imaging element 1102 and the calculated depth of field, the depth of field calculation unit 1715 detects a region in the depth of field of the frame image represented by the frame image data. In addition, the depth of field calculation unit 1715 notifies the characteristic amount acquiring unit 1704 and the scene determining unit 1705 of the region inside the depth of field (the in-focus region). It should be noted that a method of detecting the in-focus region is not particularly limited. For example, an edge region having a predetermined spatial frequency band may be detected (edge detection) and an image region in which a density of the detected edge region is higher than a predetermined threshold may be determined as the in-focus region.

Next, the operating unit 1114 receives a photography start operation. In accordance with the photography start operation, the CPU 1111 controls the respective blocks of the imaging apparatus 1700 and starts photography. In addition, the characteristic amount acquiring unit 1704 acquires a maximum brightness value of image data corresponding to the region in a depth of field notified from the depth of field calculation unit 1715 as the frame maximum brightness value, and outputs the frame maximum brightness value to the scene determining unit 1105. Next, the scene determining unit 1705 determines a plurality of scenes using the frame maximum brightness value acquired from the characteristic amount acquiring unit 1104 and the region in a depth of field notified from the depth of field calculation unit 1715.

Figure 8A:
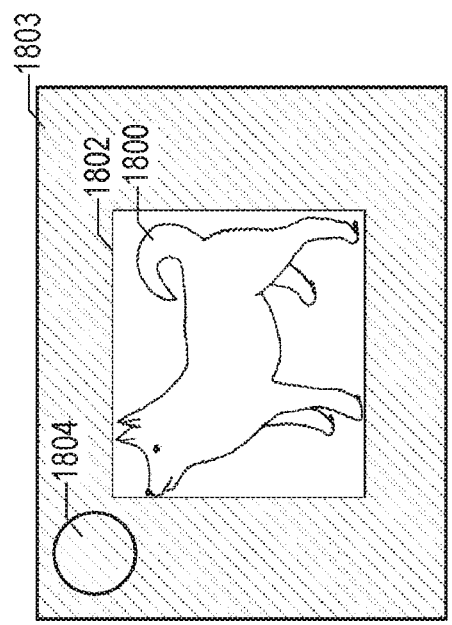
FIGS. 8A to 8D are diagrams showing an example of frame images according to the third embodiment.
Figure 8D:
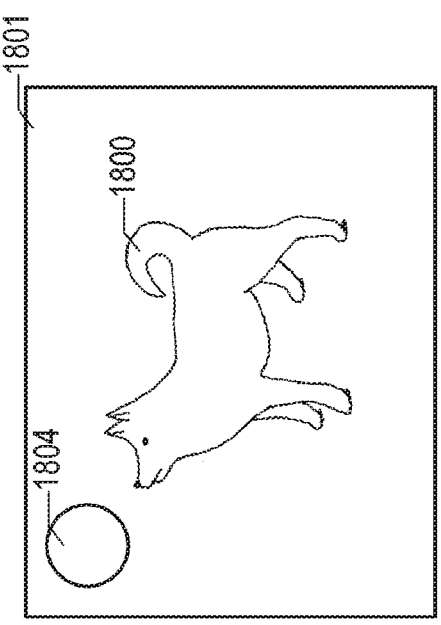
Figure 8B:
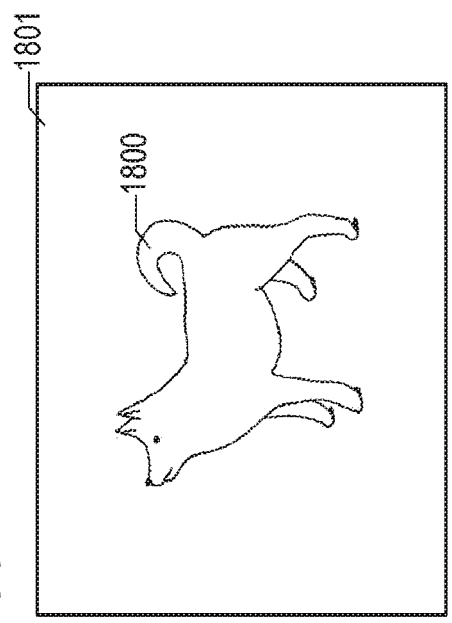
Figure 8C:
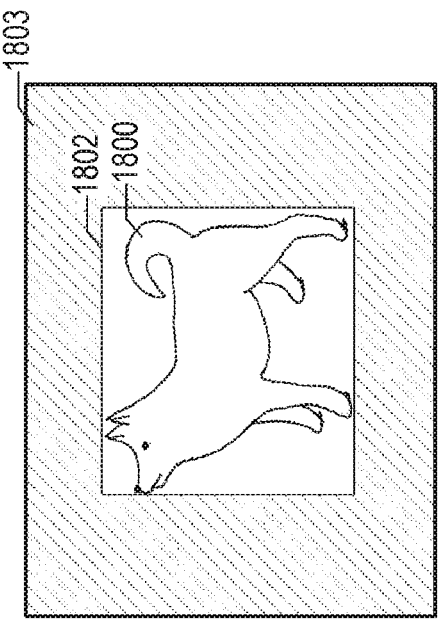

FIGS. 8A to 8D show an example of frame images. In FIGS. 8A to 8D, a focus value that brings an object 1800 into focus is set. In FIGS. 8A and 8D, a deep depth of field is set and a region 1801 (an entire frame image) is set as an in-focus region. In FIGS. 8B and 8C, a shallow depth of field is set, a region 1802 (a part of the frame image) which is narrower than the region 1801 is set as an in-focus region, and a region 1803 of the region 1801 excluding the region 1802 is set as an out-of-focus region.

In the present embodiment, a plurality of scenes are determined on the basis of a time variation of a frame maximum brightness value of the in-focus region. Therefore, even if a high brightness region 1804 is created inside the out-of-focus region 1803 and the frame maximum brightness value increases in an amount of increase that is larger than a threshold as shown in FIG. 8C, a scene is not determined (finalized) (a scene change is not performed). Accordingly, in display on the basis of dynamic metadata, a variation in an appearance of an object (a likely object of interest) inside the in-focus region due to a brightness variation that occurs outside of the in-focus region can be prevented.

In the present embodiment, when a state where the depth of field is shallow (a state where the in-focus region is narrow; FIG. 8C) changes to a state where the depth of field is deep (a state where the in-focus region is wide; FIG. 8D), a scene is determined (finalized) (a scene change is performed) in accordance with a large variation in frame maximum brightness. Accordingly, the object 180X) affected by the high brightness region 1804 can be displayed. On the other hand, when the state where the depth of field is deep (the state where the in-focus region is wide; FIG. 8D) changes to the state where the depth of field is shallow (the state where the in-focus region is narrow; FIG. 8C), a scene is not determined (finalized) (a scene change is not performed) regardless of a time variation in the frame maximum brightness. Accordingly, the object 1800 can be displayed without varying an appearance of the object 1800.

As described above, according to the present embodiment, by taking an in-focus region into consideration, more suitable dynamic metadata can be acquired and a plurality of scenes can be determined in a more suitable manner.

Fourth Embodiment

Figure 9:
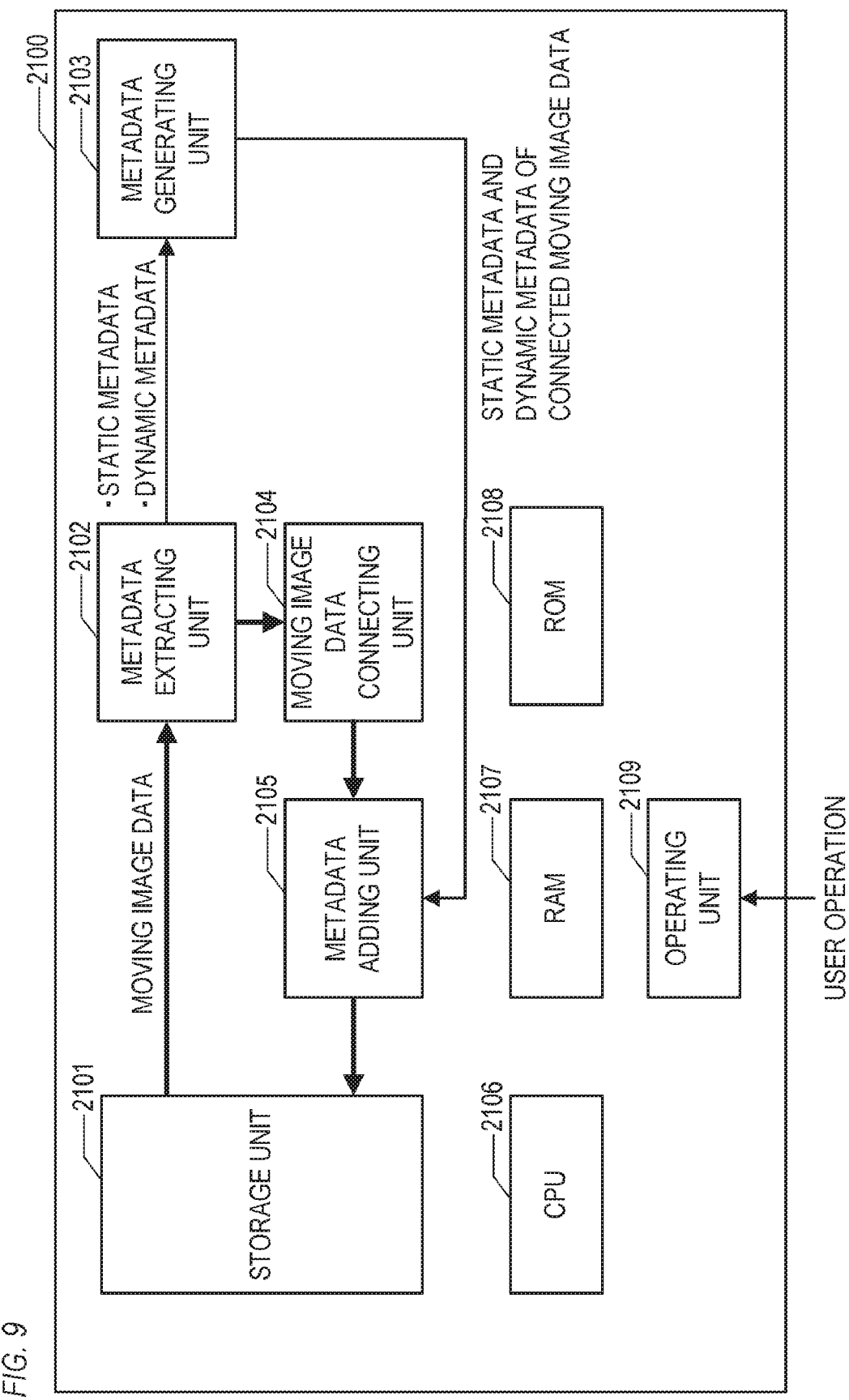
FIG. 9 is a block diagram showing a configuration example of an image processing apparatus according to the first embodiment.

A fourth embodiment of the present invention will be described below. FIG. 9 is a block diagram showing an example of a configuration of an image processing apparatus 2100 according to the present embodiment. The image processing apparatus 2100 includes a storage unit 2101, a metadata extracting unit 2102, a metadata generating unit 2103, a moving image data connecting unit 2104, a metadata adding unit 2105, a CPU 2106, a RAM 2107, a ROM 2108, and an operating unit 2109.

The storage unit 2101 is a random-access recording medium such as a CF (compact flash) card, and moving image data to which static metadata and dynamic metadata have been added is recorded in the storage unit 2101. The storage unit 2101 is detachable from the image processing apparatus 2100 and can be mounted to an apparatus other than the image processing apparatus 2100 (such as an imaging apparatus). Alternatively, the storage unit 2101 may be an internal recording medium that is not attachable to and detachable from the image processing apparatus 2100.

In the present embodiment, it is assumed that moving image data encoded by MPEG-4 AVC or HEVC (High Efficiency Video Coding) is recorded in the storage unit 2101. It is assumed that static metadata is added as a descriptor in MPEG-4 AVC or HEVC. It is assumed that dynamic metadata is added to SEI (Supplemental Enhancement Information) in MPEG-4 AVC or HEVC. It should be noted that a method of encoding moving image data, a method of adding static metadata, and a method of adding dynamic metadata are not particularly limited.

Static metadata is metadata indicating a brightness independent of a frame and a scene of a moving image and, in the present embodiment, static metadata is assumed to be metadata indicating a maximum brightness of an entire corresponding moving image (an entire moving image to which the static metadata has been added). Dynamic metadata is metadata indicating a brightness that varies depending on a frame or a scene of a moving image and, in the present embodiment, dynamic metadata is assumed to be metadata indicating a maximum brightness of each frame or each scene of a corresponding moving image.

The metadata extracting unit 2102 acquires moving image data from the storage unit 2101 in accordance with a user operation with respect to the operating unit 2109 and extracts static metadata and dynamic metadata from the acquired moving image data. The metadata extracting unit 2102 outputs the extracted static metadata and dynamic metadata to the metadata generating unit 2103. In addition, the metadata extracting unit 2102 outputs the acquired moving image data to the moving image data connecting unit 2104. In the present embodiment, the metadata extracting unit 2102 applies a decoding process on the basis of MPEG-4 AVC or HEVC to the acquired moving image data. In addition, the metadata extracting unit 2102 outputs the moving image data after the decoding process to the moving image data connecting unit 2104.

The metadata generating unit 2103 generates static metadata and dynamic metadata to be added to connected moving image data (moving image data to be generated by the moving image data connecting unit 2104), and outputs the generated static metadata and dynamic metadata to the metadata adding unit 2105. In the present embodiment, the metadata generating unit 2103 generates static metadata of the connected moving image data on the basis of a plurality of static metadata (a plurality of static metadata respectively added to a plurality of moving image data which are connection targets) output from the metadata extracting unit 2102. Accordingly, suitable metadata can be generated as the static metadata of the connected moving image data. In addition, in the present embodiment, the metadata generating unit 2103 generates dynamic metadata of the connected moving image data by connecting a plurality of dynamic metadata (a plurality of dynamic metadata respectively added to a plurality of moving image data which are connection targets) output from the metadata extracting unit 2102. Accordingly, suitable metadata can be generated as the dynamic metadata of the connected moving image data.

The moving image data connecting unit 2104 connects the plurality of moving image data output from the metadata extracting unit 2102 to generate connected moving image data that represents a connected moving image in which a plurality of moving images respectively represented by the plurality of moving image data are connected. In addition, the moving image data connecting unit 2104 outputs the connected moving image data to the metadata adding unit 2105.

The metadata adding unit 2105 adds the static metadata and the dynamic metadata output from the metadata generating unit 2103 to the connected moving image data output from the moving image data connecting unit 2104, and records the connected moving image data after adding the metadata thereto in the storage unit 2101. In the present embodiment, the metadata adding unit 2105 applies an encoding process on the basis of MPEG-4 AVC or HEVC to the connected moving image data. In addition, the metadata adding unit 2105 adds the static metadata as a descriptor in MPEG-4 AVC or HEVC and adds the dynamic metadata to SEI in MPEG-4 AVC or HEVC.

The CPU 2106 is connected via an internal bus (not illustrated) to other blocks of the image processing apparatus 2100. The CPU 2106 controls processing of the image processing apparatus 2100. The RAM 2107 is connected via the internal bus (not illustrated) to other blocks of the image processing apparatus 2100. The RAM 2107 is used as a work area of the CPU 2106 or a temporary storage area for temporarily storing various data. The ROM 2108 is connected via the internal bus (not illustrated) to other blocks of the image processing apparatus 2100. Firmware related to processing by the CPU 2106, information related to processing by the CPU 2106, and the like are recorded in the ROM 2108 in advance.

The operating unit 2109 is connected to the CPU 2106 via the internal bus (not illustrated). The operating unit 2109 is constituted by various operating members as an input unit for receiving user operations. In addition, the operating unit 2109 includes a touch panel and a liquid crystal panel (both not illustrated) and causes displayed function icons to act as various function buttons. For example, the operating unit 2109 can receive a user operation (a moving image data connection operation) which instructs a plurality of moving image data to be selected as connection targets from a plurality of moving image data stored in the storage unit 2101 and the plurality of selected moving image data to be connected. In accordance with the moving image data connection operation, the metadata extracting unit 2102 acquires a plurality of moving image data (a plurality of moving image data selected by the user) from the storage unit 2101.

Figure 10:
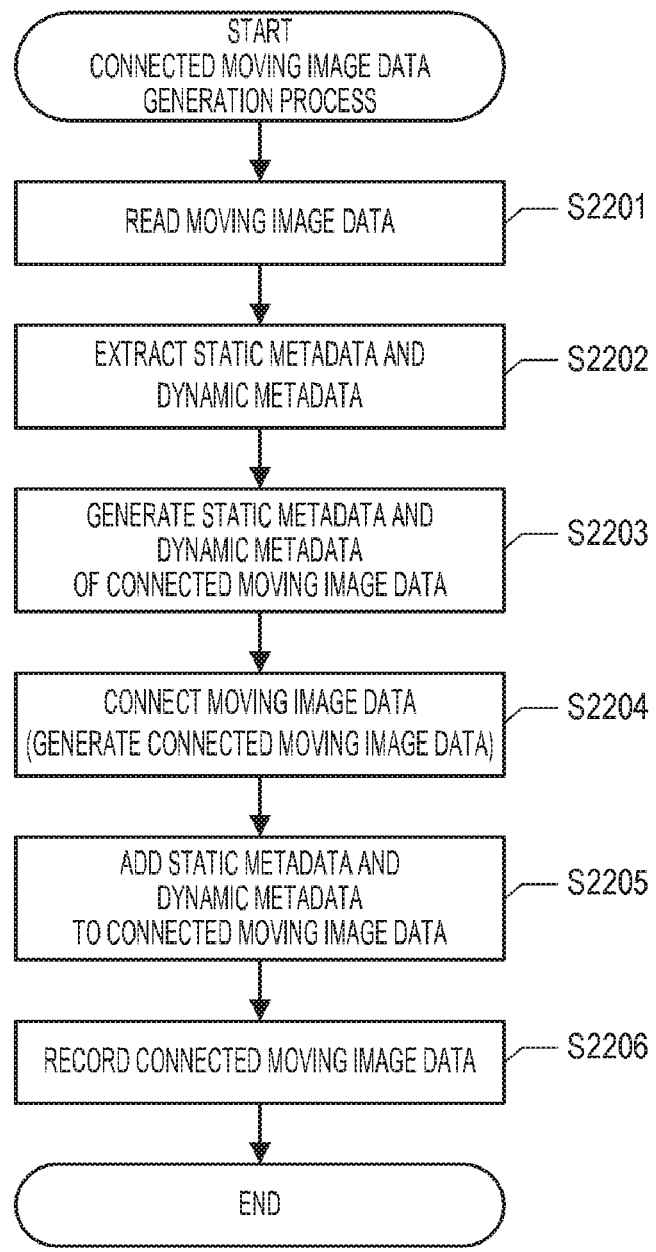
FIG. 10 is a flow chart showing an example of a connected moving image data generation process according to the first embodiment.

FIG. 10 is a flow chart showing an example of a connected moving image data generation process (a process of generating and recording connected moving image data) of the image processing apparatus 2100. The connected moving image data generation process shown in FIG. 10 is started when the CPU 2106 detects that the moving image data connection operation described above has been received by the operating unit 2109, and realized by the CPU 2106 by controlling the respective blocks of the image processing apparatus 2100.

In S2201, the metadata extracting unit 2102 reads a plurality of moving image data selected by the moving image data connection operation from the storage unit 2101. In this case, it is assumed that the moving image data A and B shown in FIG. 11 have been read.

Figure 11:
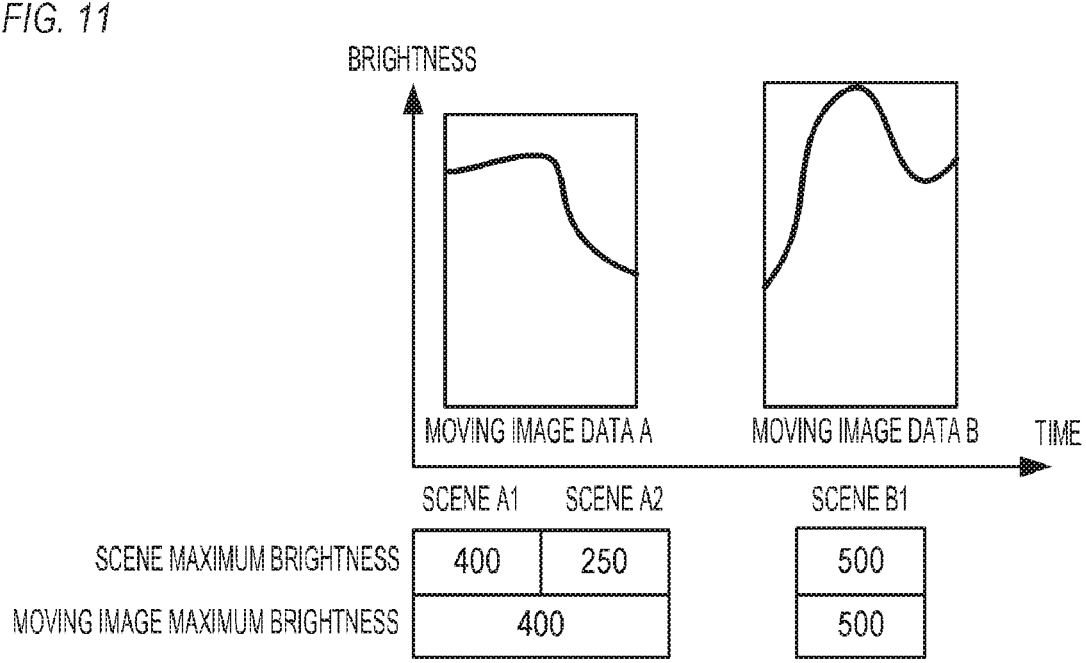
FIG. 11 is a schematic view showing an example of moving image data that is a connection target according to the first embodiment.

FIG. 11 is a schematic view showing the moving image data A and B which represent an example of moving image data that is a connection target. The moving image data A is constituted by two scenes, namely, a scene A1 and a scene A2. Dynamic metadata of the moving image data A indicates a maximum brightness (a scene maximum brightness) "400" of the scene A1 and a scene maximum brightness "250" of the scene A2. Therefore, a maximum brightness (a moving image maximum brightness) of an entire moving image represented by the moving image data A is a same brightness as the scene maximum brightness "400" of the scene A1, and static metadata of the moving image data A indicates the moving image maximum brightness "400" of the moving image data A. The moving image data B is constituted by one scene B1. Therefore, dynamic metadata of the moving image data B indicates a same brightness as a brightness indicated by static metadata of the moving image data B. Specifically, the dynamic metadata of the moving image data B indicates a scene maximum brightness "500" of the scene B1 and the static metadata of the moving image data B indicates a moving image maximum brightness "500" of the moving image data B.

In S2202, the metadata extracting unit 2102 extracts static metadata and dynamic metadata from the moving image data A and B acquired in S2201, and outputs the extracted static metadata and dynamic metadata to the metadata generating unit 2103. In addition, the metadata extracting unit 2102 outputs the moving image data A and B to the moving image data connecting unit 2104.

In S2203, the metadata generating unit 2103 generates static metadata and dynamic metadata to be added to connected moving image data on the basis of the plurality of static metadata and the plurality of dynamic metadata output from the metadata extracting unit 2102. In addition, the metadata generating unit 2103 outputs the generated static metadata and dynamic metadata to the metadata adding unit 2105.

In the present embodiment, the metadata generating unit 2103 generates, as the static metadata of the connected moving image data, metadata indicating a maximum brightness among a plurality of brightnesses respectively indicated by the plurality of static metadata output from the metadata extracting unit 2102. As described above, the static metadata of the moving image data A indicates the moving image maximum brightness "400" of the moving image data A and the static metadata of the moving image data B indicates the moving image maximum brightness "500" of the moving image data B. Therefore, the metadata generating unit 2103 generates metadata indicating the brightness "500" as the static metadata of the connected moving image data.

As described earlier, the metadata generating unit 2103 generates dynamic metadata of connected moving image data by connecting the plurality of dynamic metadata output from the metadata extracting unit 2102. Specifically, the metadata generating unit 2103 generates dynamic metadata of connected moving image data by simply splicing together the plurality of dynamic metadata. In other words, the metadata generating unit 2103 generates metadata sequentially indicating scenes A1, A2, and B1 such that the scene B1 is subsequent to the scene A2 as the dynamic metadata of the connected moving image data. Even in the dynamic metadata of the connected moving image data, the brightness "400" is indicated as a scene maximum brightness of the scene A1, the brightness "250" is indicated as a scene maximum brightness of the scene A2, and the brightness "500" is indicated as a scene maximum brightness of the scene B1.

Figure 12:
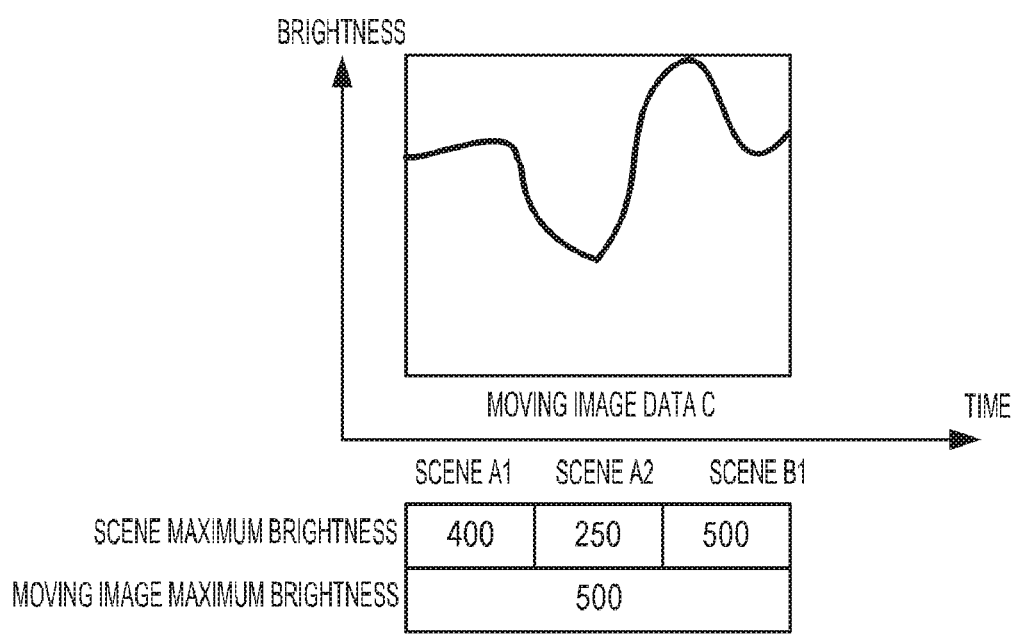
FIG. 12 is a schematic view showing an example of connected moving image data according to the first embodiment.

In S2204, the moving image data connecting unit 2104 connects the moving image data A and B output from the metadata extracting unit 2102 to generate connected moving image data C shown in FIG. 12. In addition, the moving image data connecting unit 2104 outputs the connected moving image data to the metadata adding unit 2105.

FIG. 12 is a schematic view showing the connected moving image data C generated by connecting the moving image data A and B. As shown in FIG. 12, in the connected moving image data C, the scene B1 of the moving image data B is subsequent to the scenes A1 and A2 of the moving image data A. In addition, even in the connected moving image data C, the scene maximum brightness of the scene A1 is the brightness "400", the scene maximum brightness of the scene A2 is the brightness "250", and the scene maximum brightness of the scene B1 is the brightness "500". This shows that, in S2203, metadata accurately indicating a scene maximum brightness of each scene has been generated as the dynamic metadata of the connected moving image data C.

Furthermore, as shown in FIG. 12, a moving image maximum brightness of the connected moving image data C in which the scene B1 of the moving image data B is subsequent to the scenes A1 and A2 of the moving image data A is a same brightness as the scene maximum brightness "500" of the scene B1. This shows that, in S2203, metadata accurately indicating a moving image maximum brightness of the connected moving image data C has been generated as the static metadata of the connected moving image data C.

In S2205, the metadata adding unit 2105 adds the static metadata and the dynamic metadata generated in S2203 to the connected moving image data C generated in S2204.

In S2206, the metadata adding unit 2105 records the connected moving image data C after the addition in S2205 (the connected moving image data C after adding the static metadata and the dynamic metadata thereto) in the storage unit 2101.

As described above, according to the present embodiment, suitable metadata can be generated and added with respect to connected moving image data.

While an example in which static metadata and dynamic metadata are generated and added to connected moving image data has been described in the present embodiment, static metadata may be generated and added to the connected moving image data without performing the processes related to dynamic metadata. The processes related to dynamic metadata include the process of extracting dynamic metadata of moving image data read from the storage unit 2101, the process of generating dynamic metadata of connected moving image data, and the process of adding the dynamic metadata to the connected moving image data.

It should be noted that while an example in which two moving image data A and B are connected has been described in the present embodiment, three or more moving image data may be considered connection targets.

Moreover, while an example in which static metadata of connected moving image data is generated so as to indicate a maximum brightness of an entire connected moving image has been described in the present embodiment, the static metadata of connected moving image data may indicate other brightnesses. For example, metadata indicating an average brightness of a plurality of brightnesses respectively indicated by a plurality of static metadata (a plurality of static metadata respectively added to a plurality of moving image data that are connection targets) may be generated as the static metadata of the connected moving image data. Accordingly, when displaying a connected moving image on a display surface at a display brightness (a brightness on the display surface) in accordance with the static metadata of the connected moving image data, a variation of the display brightness from before the connection can be reduced over the entire connected moving image. Metadata indicating another representative brightness (a minimum brightness, a modal brightness, an intermediate brightness, or the like) of a plurality of brightnesses may be generated as the static metadata of connected moving image data.

Fifth Embodiment

Figure 13:
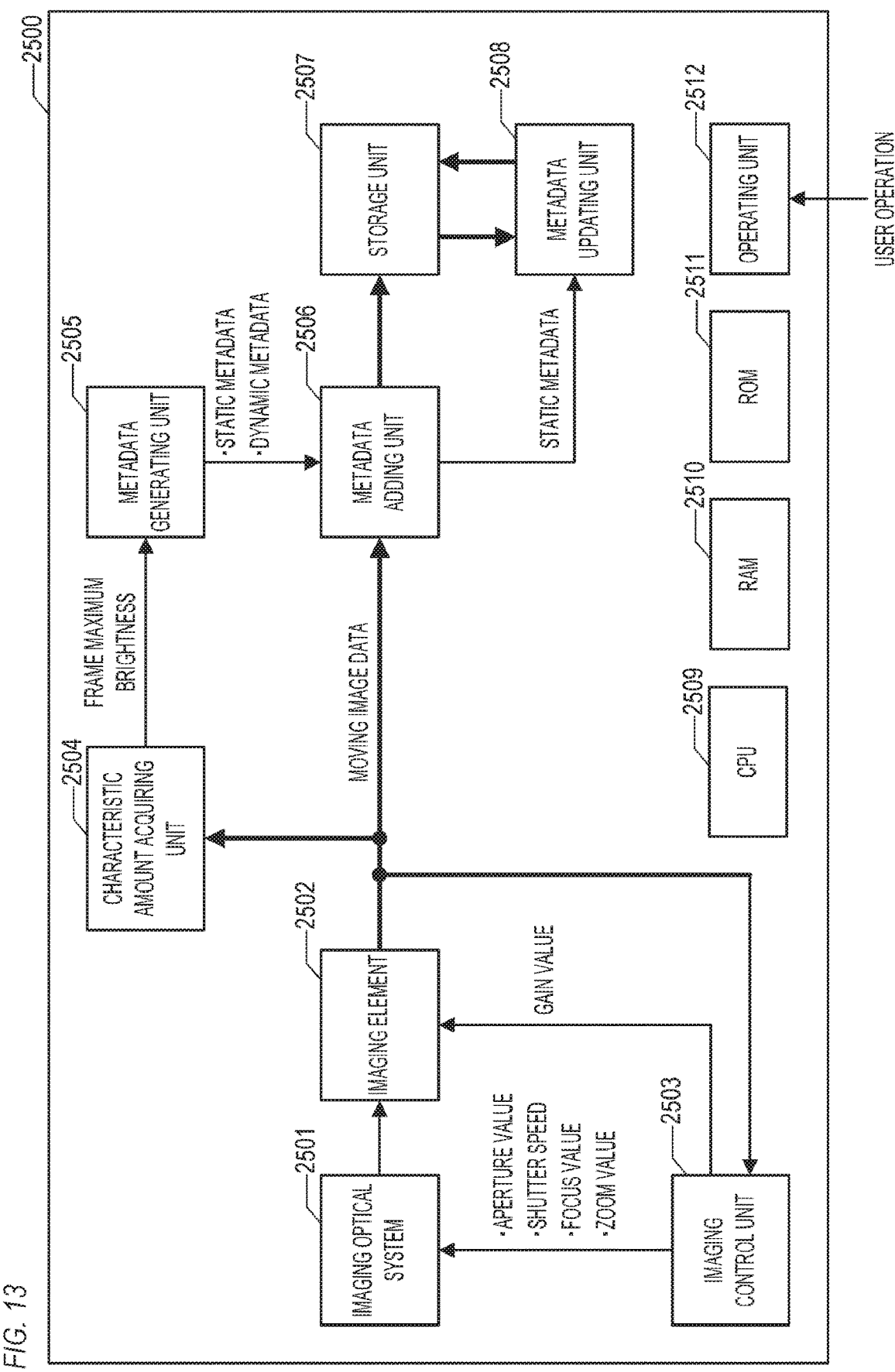
FIG. 13 is a block diagram showing a configuration example of an imaging apparatus according to the second embodiment.

A fifth embodiment of the present invention will be described below. FIG. 13 is a block diagram showing a configuration example of an imaging apparatus 2500 according to the present embodiment. The imaging apparatus 2500 includes an imaging optical system 2501, an imaging element 2502, an imaging control unit 2503, a characteristic amount acquiring unit 2504, a metadata generating unit 2505, a metadata adding unit 2506, a storage unit 2507, a metadata updating unit 2508, a CPU 2509, a RAM 2510, a ROM 2511, and an operating unit 2512.

The imaging optical system 2501 forms an optical image representing an object on the imaging element 2502 in a similar manner to the imaging optical system 1101 according to the first embodiment.

The imaging element 2502 captures a moving image (an object image) representing the object and generates moving image data representing the moving image. In the present embodiment, present moving image data generated by the imaging element 2502 (moving image data of a target to be recorded in the storage unit 2507) will be described as "target data". Specifically, the imaging element 2502 performs a photoelectric conversion process and an AD conversion process (analog-digital conversion process) in a similar manner to the imaging element 1102 according to the first embodiment. Subsequently, the imaging element 2502 outputs frame image data obtained by the AD conversion process to the characteristic amount acquiring unit 2504 and the metadata adding unit 2506. By repeating these processes, the imaging element 2502 sequentially outputs a plurality of frame image data respectively corresponding to a plurality of frames of a moving image.

The imaging control unit 2503 controls imaging conditions of the imaging apparatus 2500 in a similar manner to the imaging control unit 1103 according to the first embodiment.

The characteristic amount acquiring unit 2504 acquires a frame characteristic amount from frame image data in a similar manner to the characteristic amount acquiring unit 1104 according to the first embodiment. In the present embodiment, the characteristic amount acquiring unit 2504 acquires a maximum brightness (a frame maximum brightness) of an image of one frame represented by the frame image data and outputs the acquired frame maximum brightness to the metadata generating unit 2505. In the present embodiment, a plurality of frame maximum brightnesses respectively corresponding to a plurality of frames of a moving image (a target moving image) represented by the target data are sequentially output from the characteristic amount acquiring unit 2504.

The metadata generating unit 2505 generates static metadata and dynamic metadata with respect to the target data. In other words, the metadata generating unit 2505 generates static metadata and dynamic metadata to be added to the target data. In the present embodiment, the metadata generating unit 2505 generates static metadata indicating a moving image maximum brightness of the target data and dynamic metadata indicating a scene maximum brightness of the target data on the basis of the plurality of frame maximum brightnesses sequentially output from the characteristic amount acquiring unit 2504. The metadata generating unit 2505 outputs the generated static metadata and dynamic metadata to the metadata adding unit 2506.

The metadata adding unit 2506 adds the static metadata and the dynamic metadata output from the metadata generating unit 2505 to the target data generated by the imaging element 2502 (the moving image data made up of a plurality of frame image data sequentially output from the imaging element 2502). In addition, the metadata adding unit 2506 is capable of associating the target data with other moving image data generated in the past by the imaging element 2502. In the present embodiment, the metadata adding unit 2506 adds identification information (an identifier) to the target data. When associating the target data with other moving image data, identification information that is the same as identification information added to the other moving image data is added to the target data. When not associating the target data with other moving image data, identification information that differs from the identification information added to the other moving image data is added to the target data. The metadata adding unit 2506 records the target data after adding the static metadata, the dynamic metadata, and the identification information thereto in the storage unit 2507.

It should be noted that a method of adding the identification information is not particularly limited. For example, the identification information may be added as a part of static metadata. The identification information may be added (described) as at least a part of a file name of the target data. For example, a character string in which a file number is described after a character string corresponding to the identification information may be used as a file name. The identification information may be automatically generated or generated manually in accordance with a user operation. Generation of the identification information may be switched between automatic generation and manual generation in accordance with the photography mode set by the CPU 2509. A method of association is not limited to a method using identification information. For example, a management table that manages association of a plurality of moving image data may be used to associate a plurality of moving image data.

The storage unit 2507 is a recording medium similar to the storage unit 1109 according to the first embodiment and stores the moving image data output from the metadata adding unit 2506 (the moving image data after adding the static metadata, the dynamic metadata, and the identification information thereto).

When the target data is associated with other moving image data, the metadata updating unit 2508 updates at least one of the static metadata of the other moving image data and the static metadata of the target data on the basis of the static metadata (so that the static metadata indicate a same brightness). The dynamic metadata is not updated. Accordingly, with respect to moving image data expected to be connected (moving image data prior to connection), suitable static metadata and dynamic metadata (static metadata and dynamic metadata expected to be connected) can be generated and added. In the present embodiment, when the target data is associated with other moving image data, the metadata updating unit 2508 reads the moving image data from the storage unit 2507 and updates static metadata of at least any of the plurality of read moving image data. Whether or not such an update is to be performed may be selected in accordance with the photography mode set by the CPU 2509.

The CPU 2509, the RAM 2510, and the ROM 2511 are respectively configured in a similar manner to the CPU 1111, the RAM 1112, and the ROM 1113 according to the first embodiment.

The operating unit 2512 is configured in a similar manner to the operating unit 1114 according to the first embodiment and includes a moving image photography mode selection button for setting a moving image photography mode and the like. The CPU 2509 sets the photography mode or changes the set photography mode in accordance with a user operation with respect to the moving image photography mode selection button. In addition, the operating unit 2512 is capable of receiving a user operation for designating identification information (an identification information designation operation). The metadata adding unit 2506 adds identification information in accordance with the identification information designation operation (identification information designated by the user) to the target data.

Figure 14:
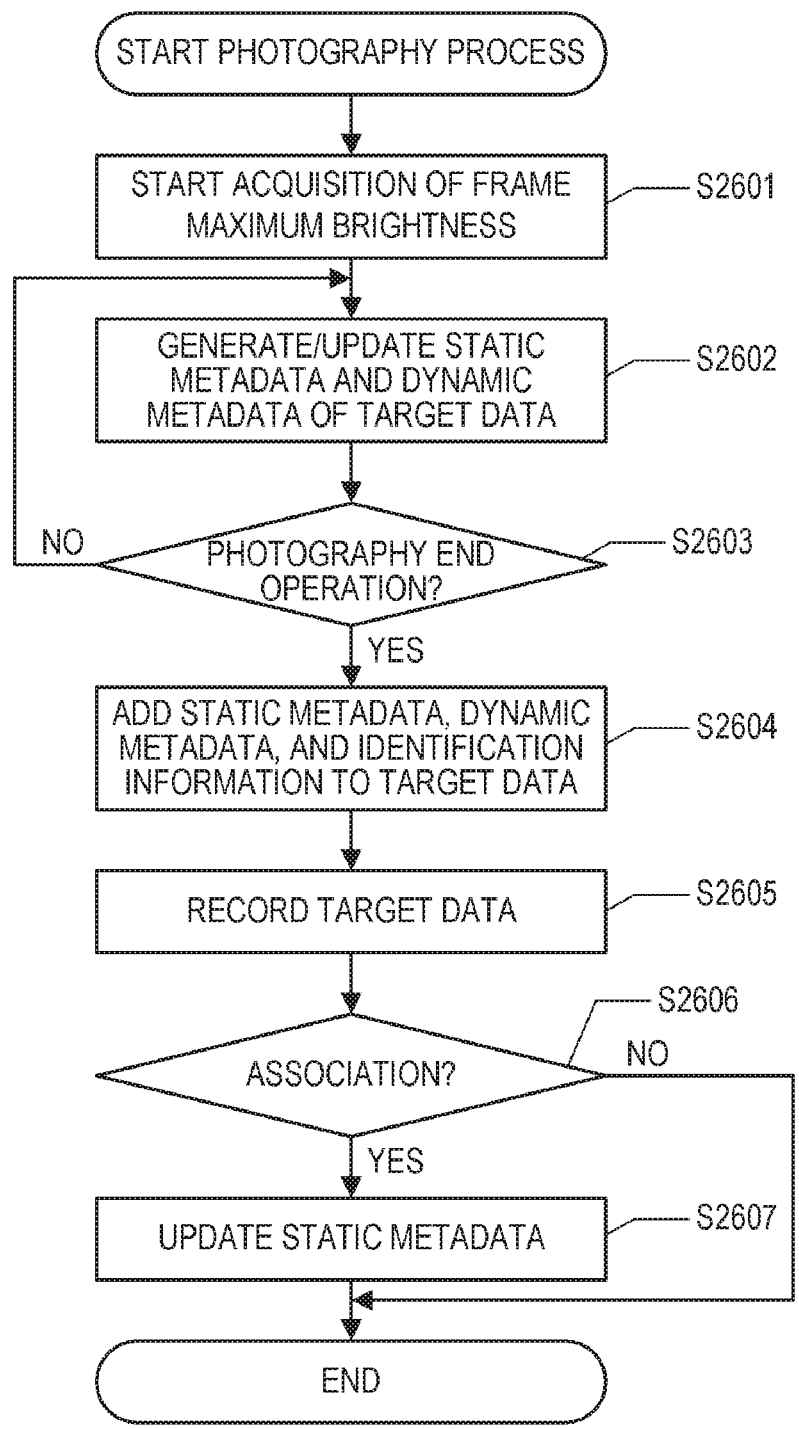
FIG. 14 is a flow chart showing an example of a photography process according to the second embodiment.

FIG. 14 is a flow chart showing an example of a photography process by the imaging apparatus 2500.

In S2601, the characteristic amount acquiring unit 2504 starts acquisition of a frame maximum brightness $L_{MAX\_NOW}$ of frame image data output from the imaging element 2502. The characteristic amount acquiring unit 2504 outputs the frame maximum brightness $L_{MAX\_NOW}$ to the metadata generating unit 2505. The frame maximum brightness $L_{MAX\_NOW}$ represents a frame maximum brightness of frame image data generated at the present timing $t_{NOW}$.

In S2602, the metadata generating unit 2505 generates/updates static metadata and dynamic metadata (a scene maximum brightness and a moving image maximum brightness) of the target data on the basis of the frame maximum brightness $L_{MAX\_NOW}$ at the present timing $t_{NOW}$. In the present embodiment, during photography of the target moving image, the frame maximum brightness $L_{MAX\_NOW}$ is updated at a frame rate of the target data and the process of S2602 is repeated. In S2602 for a first time, the metadata generating unit 2505 records the frame maximum brightness $L_{MAX\_NOW}$ as the scene maximum brightness and the moving image maximum brightness in the RAM 2510. In S2602 for second and subsequent times, the metadata generating unit 2505 compares the frame maximum brightness $L_{MAX\_NOW}$ with the brightness recorded in the RAM 2510 (recorded brightness; the scene maximum brightness and the moving image maximum brightness). In addition, when the frame maximum brightness $L_{MAX\_NOW}$ is higher than the recorded brightness, the metadata generating unit 2505 updates the recorded brightness with the frame maximum brightness $L_{MAX\_NOW}$.

In S2603, the CPU 2509 determines whether or not the operating unit 2512 has received a photography end operation by the user. When it is determined that a photography end operation has not been performed (S2603: No), the process is returned to S2602, but when it is determined that a photography end operation has been performed (S2603: Yes), the process is advanced to S2604. When the process advances from S2603 to S2604, the metadata generating unit 2505 reads the static metadata and the dynamic metadata (the scene maximum brightness and the moving image maximum brightness) of the target data from the RAM 2510 and outputs the read static metadata and dynamic metadata to the metadata adding unit 2506.

In S2604, the metadata adding unit 2506 adds the static metadata and the dynamic metadata output from the metadata generating unit 2505 to target data (moving image data made up of a plurality of frame image data sequentially output from the imaging element 2502). Furthermore, the metadata adding unit 2506 adds identification information to the target data.

In S2605, the metadata adding unit 2506 records the target data after adding the static metadata, the dynamic metadata, and the identification information thereto in the storage unit 2507.

In S2606, the CPU 2509 determines whether or not there is moving image data (stored in the storage unit 2507) to which the same identification information as the identification information of the target data has been added. In other words, the CPU 2509 determines whether or not the target data has been associated with other moving image data. When it is determined that there is no moving image data to which the same identification information as the identification information of the target data has been added or, in other words, the target data has not been associated with other moving image data (S2606: No), the photography process shown in FIG. 14 is ended. When it is determined that there is moving image data to which the same identification information as the identification information of the target data has been added or, in other words, the target data has been associated with other moving image data (S2606: Yes), the process is advanced to S2607.

In S2607, the metadata updating unit 2508 updates at least one of the static metadata of the other moving image data associated with the target data and the static metadata of the target data on the basis of the static metadata. In the present embodiment, when a brightness (a first brightness) indicated by the static metadata of the other moving image data is higher than a brightness (a second brightness) indicated by the static metadata of the target data, the static metadata of the target data is updated so as to indicate the first brightness. When the first brightness is lower than the second brightness, the static metadata of the other moving image data is updated so as to indicate the second brightness. As a result, after the update, both the static metadata of the other moving image data and the static metadata of the target data indicate a moving image maximum brightness of connected moving image data that is generated by connecting the target data and the other moving image data. When the first brightness is equal to the second brightness, neither the static metadata of the other moving image data nor the static metadata of the target data is updated.

While metadata with the same static metadata as the target data is generated and added as the dynamic metadata of the target data in the photography process shown in FIG. 14, this is not restrictive. For example, generation and an update of dynamic metadata may not be performed in S2602 and addition of dynamic metadata may not be performed in S2605. Instead, prior to S2602, the metadata adding unit 2506 may add the frame maximum brightness $L_{MAX\_NOW}$ at the present timing $t_{NOW}$ to frame image data at the present timing $t_{NOW}$ as a part of dynamic metadata. In this case, dynamic metadata indicating a frame maximum brightness of each frame of a target moving image is to be generated and added to the target data. Although a period is created in which dynamic metadata is added to the target data but static metadata is not added to the target data, eventually, target data to which both dynamic metadata and static metadata are added is to be obtained. A scene change may be automatically or manually detected during photography of a target moving image and dynamic metadata indicating a scene maximum brightness of each scene of the target moving image may be generated and added to the target data.

A specific example of the photography process shown in FIG. 14 will be described with reference to FIGS. 15A to 15G FIGS. 15A to 15G are schematic views showing an example of a time variation of a frame maximum brightness, a scene maximum brightness (dynamic metadata), a moving image maximum brightness (static metadata), and the like of moving image data. In the photography process shown in FIG. 14, moving image data (target data) representing a moving image constituted by one scene is generated and recorded. Therefore, each of the moving image data D1 to D3 shown in FIGS. 15A to 15G represents a moving image constituted by one scene.

Figure 15A:
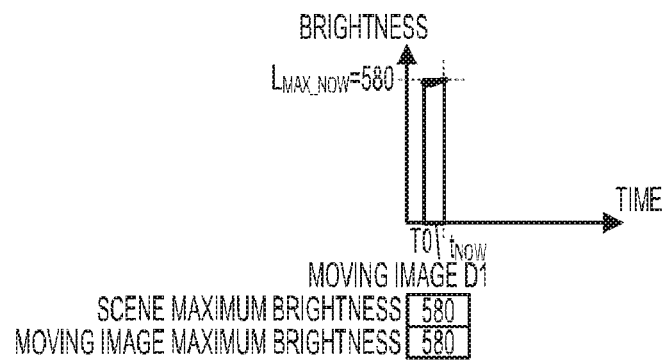
FIGS. 15A to 15G are schematic views showing a specific example of the photography process according to the second embodiment.

First, let us assume that photography of the moving image data D1 starts at a timing T0. FIG. 15A shows a state during photography of the moving image data D1. Among a plurality of frame maximum brightnesses obtained up to the present timing $t_{NOW}$ (a plurality of frame maximum brightnesses of the moving image data D1), the frame maximum brightness $L_{MAX\_NOW}$ "580" of the present timing $t_{NOW}$ is highest. Therefore, due to the process of S2602, the frame maximum brightness $L_{MAX\_NOW}$ "580" is set as a scene maximum brightness and a moving image maximum brightness of the moving image data D1.

Figure 15B:
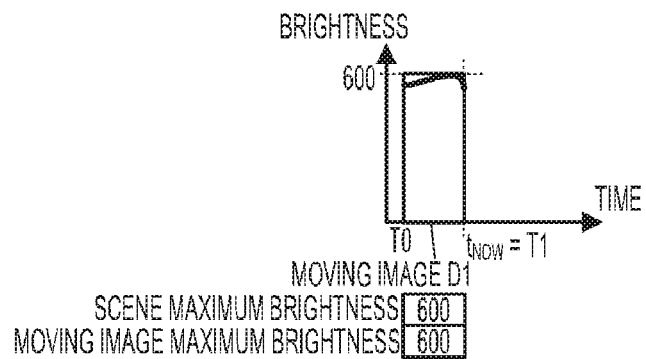

Next, let us assume that the photography of the moving image data D1 ends at a timing T1. FIG. 15B shows a state at the timing T1 at which the photography of the moving image data D1 ends or, in other words, a state where the present timing $t_{NOW}$ is the timing T1. A frame maximum brightness that is higher than the frame maximum brightness "580" has been obtained prior to the timing T1 and, among a plurality of frame maximum brightnesses obtained up to the timing T1 (a plurality of frame maximum brightnesses of the moving image data D1), a frame maximum brightness "600" is highest. Therefore, due to the process of S2602, the scene maximum brightness and the moving image maximum brightness of the moving image data D1 are updated from the brightness "580" to the brightness "600".

Subsequently, dynamic metadata indicating the scene maximum brightness "600" and static metadata indicating the moving image maximum brightness "600" are added to the moving image data D1 (S2604). The moving image data D1 after adding the static metadata and the dynamic metadata thereto is recorded in the storage unit 2507 (S2605). At this point, let us assume that the moving image data D1 has not been associated with other moving image data. Therefore, the process of S2607 is not performed and the static metadata of the moving image data D1 is not updated.

Figure 15C:
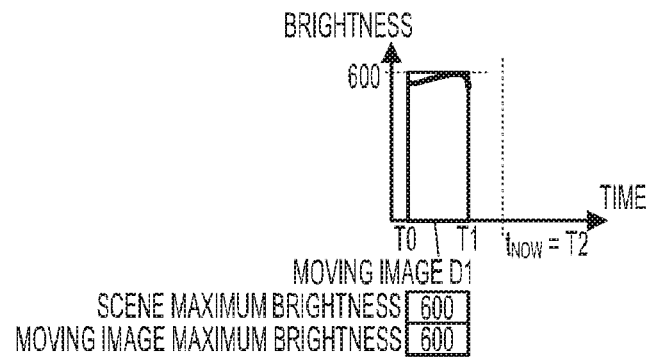

Next, let us assume that photography of the moving image data D2 starts at a timing T2. FIG. 15C shows a state at the timing T2 at which the photography of the moving image data D2 starts or, in other words, a state where the present timing $t_{NOW}$ is the timing T2.

Figure 15D:
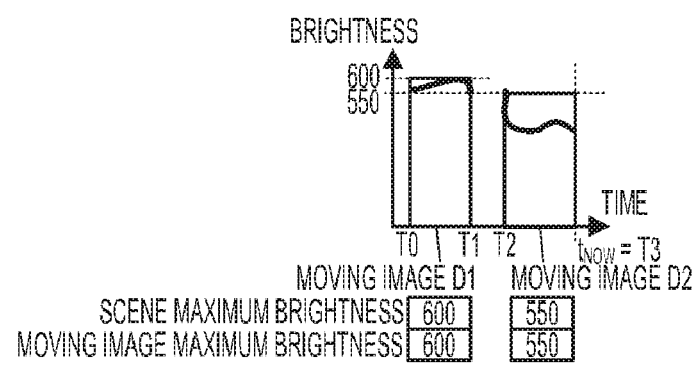

In addition, let us assume that the photography of the moving image data D2 ends at a timing T3. FIG. 15D shows a state at the timing T3 at which the photography of the moving image data D2 ends or, in other words, a state where the present timing $t_{NOW}$ is the timing T3. Among a plurality of frame maximum brightnesses obtained from the timing T2 to the timing T3 (the present timing $t_{NOW}$) (a plurality of frame maximum brightnesses of the moving image data D2), a frame maximum brightness "550" is highest. Therefore, due to the process of S2602, the brightness "550" is set as a scene maximum brightness and a moving image maximum brightness of the moving image data D2.

Subsequently, dynamic metadata indicating the scene maximum brightness "550" and static metadata indicating the moving image maximum brightness "550" are added to the moving image data D2 (S2604). The moving image data D2 after adding the static metadata and the dynamic metadata thereto is recorded in the storage unit 2507 (S2605).

Figure 15E:
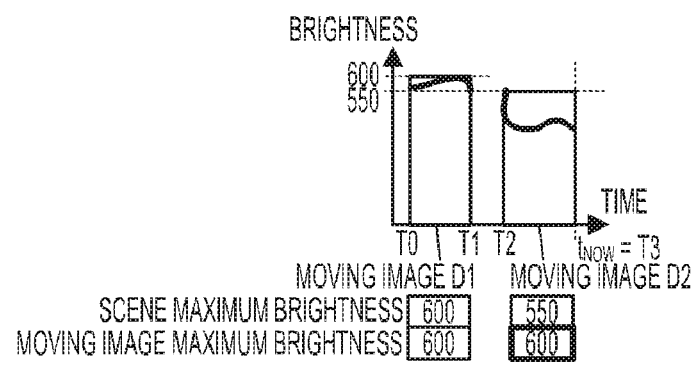

At this point, let us assume that the moving image data D2 has been associated with the moving image data D1. Therefore, due to the process of S2607, the static metadata of the moving image data D1 or the static metadata of the moving image data D2 is updated. Specifically, since the moving image maximum brightness "600" of the moving image data D1 is higher than the moving image maximum brightness "550" of the moving image data D2, the static metadata of the moving image data D2 is updated so as to indicate the moving image maximum brightness "600" of the moving image data D1. The dynamic metadata of the moving image data D2 is not updated and indicates the scene maximum brightness "550" of the moving image data D2. FIG. 15E shows a state after the static metadata of the moving image data D2 has been updated. It should be noted that, when the moving image maximum brightness of the moving image data D1 is lower than the moving image maximum brightness of the moving image data D2, the static metadata of the moving image data D1 is updated so as to indicate the moving image maximum brightness of the moving image data D2.

Figure 15F:
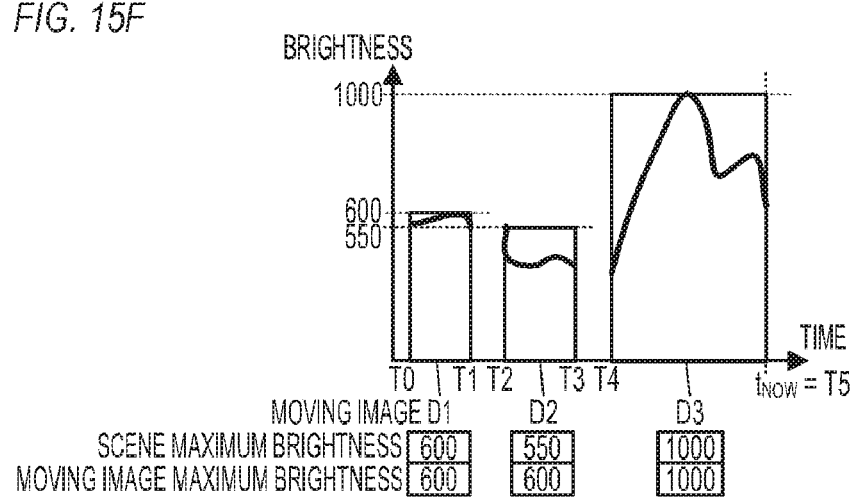

Next, let us assume that photography of the moving image data D3 starts at a timing T4 and the photography of the moving image data D3 ends at a timing T5. FIG. 15F shows a state at the timing T5 at which the photography of the moving image data D3 ends or, in other words, a state where the present timing $t_{NOW}$ is the timing T5. Among a plurality of frame maximum brightnesses obtained from the timing T4 to the timing T5 (the present timing $t_{NOW}$) (a plurality of frame maximum brightnesses of the moving image data D3), a frame maximum brightness "1000" is highest. Therefore, due to the process of S2602, the brightness "1000" is set as a scene maximum brightness and a moving image maximum brightness of the moving image data D3.

Subsequently, dynamic metadata indicating the scene maximum brightness "1000" and static metadata indicating the moving image maximum brightness "1000" are added to the moving image data D3 (S2604). The moving image data D3 after adding the static metadata and the dynamic metadata thereto is recorded in the storage unit 2507 (S2605).

Figure 15G:
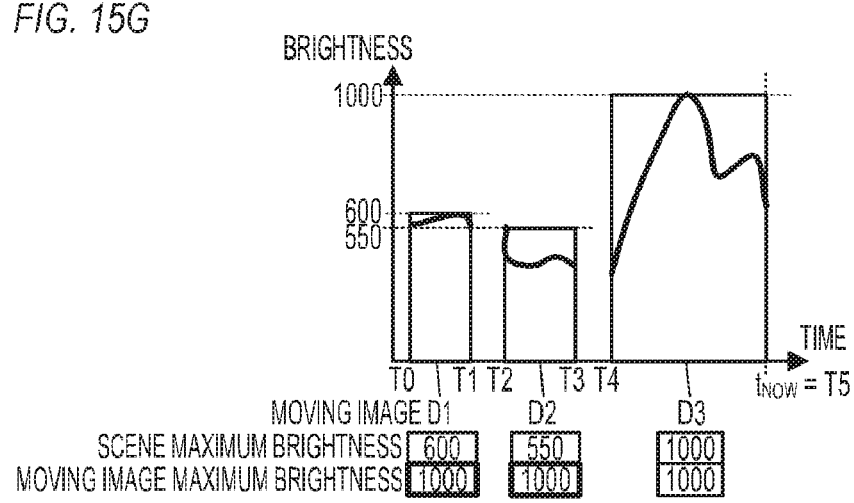

At this point, let us assume that the moving image data D3 has been associated with the moving image data D1 and D2. Therefore, due to the process of S2607, the static metadata of the moving image data D1 and D2 or the static metadata of the moving image data D3 is updated. Specifically, a common brightness (a moving image maximum brightness after update shown in FIG. 15E) "600" respectively indicated by the static metadata of the moving image data D1 and the static metadata of the moving image data D2 is lower than the moving image maximum brightness "1000" of the moving image data D3. Therefore, the static metadata of the moving image data D1 and D2 are updated so as to indicate the moving image maximum brightness "1000" of the moving image data D3. The dynamic metadata of the moving image data D1 and D2 are not updated, the dynamic metadata of the moving image data D1 indicates the scene maximum brightness "600" of the moving image data D1, and the dynamic metadata of the moving image data D2 indicates the scene maximum brightness "550" of the moving image data D2. FIG. 15G shows a state after the static metadata of the moving image data D1 and D2 have been updated. It should be noted that, when the moving image maximum brightness (the common brightness described above) of the moving image data D1 and D2 is lower than the moving image maximum brightness of the moving image data D3, the static metadata of the moving image data D3 is updated so as to indicate the moving image maximum brightness of the moving image data D1 and D2.

As shown in FIGS. 15A to 15G, in the present embodiment, metadata indicating a moving image maximum brightness of connected moving image data can be obtained as static metadata to be added to moving image data prior to connection. In addition, as dynamic metadata to be added to moving image data prior to connection, metadata indicating a scene maximum brightness of the moving image data or the connected moving image data can be obtained. As a result, connected moving image data to which suitable static metadata and dynamic metadata has been added can be readily generated. As an example, let us consider a simple configuration in which any of a plurality of static metadata respectively added to a plurality of moving image data prior to connection is selected as static metadata of connected moving image data. Such a configuration enables static metadata indicating a moving image maximum brightness of the connected moving image data to be always selected.

As described above, according to the present embodiment, suitable metadata can be generated and added with respect to moving image data prior to connection.

It should be noted that static metadata may be generated and added to moving image data without performing the processes related to dynamic metadata (processes of generating dynamic metadata and adding the dynamic metadata to moving image data) in a similar manner to the fourth embodiment.

Depending on a method of association, when associating target data with a plurality of other moving image data, a brightness indicated by static metadata may differ among the plurality of other moving image data. In this case, for example, at least any of the plurality of static metadata of the target data and the plurality of other moving image data may be updated so as to indicate a maximum brightness among a plurality of brightnesses indicated by the plurality of static metadata.

While an example in which static metadata of target data is updated after recording the target data to which the static metadata had been added is described in the present embodiment, a timing of updating the static metadata of the target data is not limited thereto. The static metadata added to the target data may be updated before recording the target data or the static metadata to be added to the target data may be updated before adding the static metadata to the target data.

Moreover, while an example in which static metadata is updated to as to indicate a maximum brightness among a plurality of brightnesses respectively indicated by a plurality of static metadata is described in the present embodiment, the static metadata after the update may indicate another brightness. For example, static metadata may be updated so as to indicate another representative brightness (a minimum brightness, a modal brightness, an intermediate brightness, an average brightness, or the like) of a plurality of brightnesses.

According to the fourth and fifth embodiments, the following aspects (configurations) are disclosed.

First Aspect

An image processing apparatus comprising:
a connecting unit configured to generate, by connecting a plurality of moving image data, connected moving image data representing a connected moving image in which a plurality of moving images respectively represented by the plurality of moving image data are connected;
a generating unit configured to generate metadata; and
an adding unit configured to add the metadata to the connected moving image data, wherein
metadata indicating a maximum brightness of the entire of a corresponding moving image is added to each of the plurality of moving image data as first metadata indicating a brightness independent of a frame and a scene of a moving image, and the generating unit generates, on a basis of a plurality of first metadata respectively added to the plurality of moving image data, first metadata to be added to the connected moving image data.

Second Aspect

The image processing apparatus according to the first aspect, wherein
the generating unit generates, as the first metadata to be added to the connected moving image data, metadata indicating a maximum brightness among a plurality of brightnesses respectively indicated by the plurality of first metadata.

Third Aspect

An image processing apparatus according to the first or second aspect, wherein
metadata indicating a maximum brightness of each frame or each scene of the corresponding moving image is further added to each of the plurality of moving image data as second metadata indicating a brightness that varies depending on a frame or a scene of a moving image, and
the generating unit further generates, by connecting a plurality of second metadata respectively added to the plurality of moving image data, second metadata to be added to the connected moving image data.

Fourth Aspect

An imaging apparatus comprising:
an image sensor configured to generate, by capturing a moving image, target data that is moving image data representing the moving image;
an associating unit capable of associating the target data with other moving image data generated by the image sensor;
a generating unit configured to generate, with respect to the target data, metadata indicating a maximum brightness of the entire of a moving image represented by the target data as first metadata indicating a brightness independent of a frame and a scene of a moving image;
an adding unit configured to add, to the target data, the first metadata generated with respect to the target data and
an updating unit configured to update, in a case where the target data is associated with the other moving image data, on a basis of the first metadata added to the other moving image data and the first metadata to be added to or already added to the target data, at least one of the first metadata of the other moving image data and the first metadata of the target data.

Fifth Aspect

The imaging apparatus according to the fourth aspect, wherein
in a case where the target data is associated with the other moving image data, the updating unit updates at least one of the first metadata of the other moving image data and the first metadata of the target data so that the first metadata of the other moving image data and the first metadata of the target data indicate a same brightness.

Sixth Aspect

The imaging apparatus according to the fourth or fifth aspect, wherein
the associating unit adds identification information to the target data, and
the target data is associated with the other moving image data by addition to the target data of identification information that is the same as identification information added to the other moving image data.

Seventh Aspect

The imaging apparatus according to any one of the fourth to sixth aspects, wherein in a case where the target data is associated with the other moving image data and, and a first brightness indicated by the first metadata of the other moving image data is higher than a second brightness indicated by the first metadata of the target data, the updating unit updates the first metadata of the target data so as to indicate the first brightness.

Eighth Aspect

The imaging apparatus according to any one of the fourth to seventh aspects, wherein in a case where the target data is associated with the other moving image data and, and a first brightness indicated by the first metadata of the other moving image data is lower than a second brightness indicated by the first metadata of the target data, the updating unit updates the first metadata of the other moving image data so as to indicate the second brightness.

Ninth Aspect

The imaging apparatus according to any one of the fourth to eighth aspects, wherein in a case where the target data is associated with a plurality of other moving image data, the updating unit updates at least one of a plurality of first metadata of the target data and the plurality of other moving image data so as to indicate a maximum brightness among a plurality of brightnesses indicated by the plurality of first metadata.

Tenth Aspect

The imaging apparatus according to any one of the fourth to ninth aspects, wherein if second moving image data representing a second moving image is generated and the second moving image data is associated with first moving image data representing a first moving image to which first metadata indicating a maximum brightness of the entire of the first moving image has been added, the updating unit updates first metadata of the second moving image data so as to indicate the maximum brightness of the entire of the first moving image in a case where the maximum brightness of the entire of the first moving image is higher than a maximum brightness of the entire of the second moving image, and updates the first metadata of the first moving image data so as to indicate the maximum brightness of the entire of the second moving image in a case where the maximum brightness of the entire of the first moving image is lower than the maximum brightness of the entire of the second moving image.

Eleventh Aspect

The imaging apparatus according to the tenth aspect, wherein if third moving image data representing a third moving image is generated and the third moving image data is associated with the first moving image data and the second moving image data which have been associated with each other, the updating unit updates first metadata of the third moving image data so as to indicate a common brightness respectively indicated by the first metadata of the first moving image data and the first metadata of the second moving image data in a case where the common brightness is higher than a maximum brightness of the entire of the third moving image, and updates the first metadata of the first moving image data and the first metadata of the second moving image data so as to indicate the maximum brightness of the entire of the third moving image in a case where the common brightness is lower than the maximum brightness of the entire of the third moving image.

Twelfth Aspect

The imaging apparatus according to any one of the fourth to eleventh aspects, further comprising a setting unit configured to set one of a plurality of photography modes, wherein the updating unit switches between updating and not updating the first metadata in a case where the target data is associated with the other moving image data in accordance with a photography mode set by the setting unit.

Thirteenth Aspect

The imaging apparatus according to any one of the fourth to twelfth aspects, wherein the generating unit further generates, with respect to the target data, metadata indicating a maximum brightness of each frame or each scene of a moving image represented by the target data as second metadata indicating a brightness that varies depending on a frame or a scene of a moving image, and the adding unit adds, to the target data, the second metadata generated with respect to the target data.

Sixth Embodiment

Figure 16:
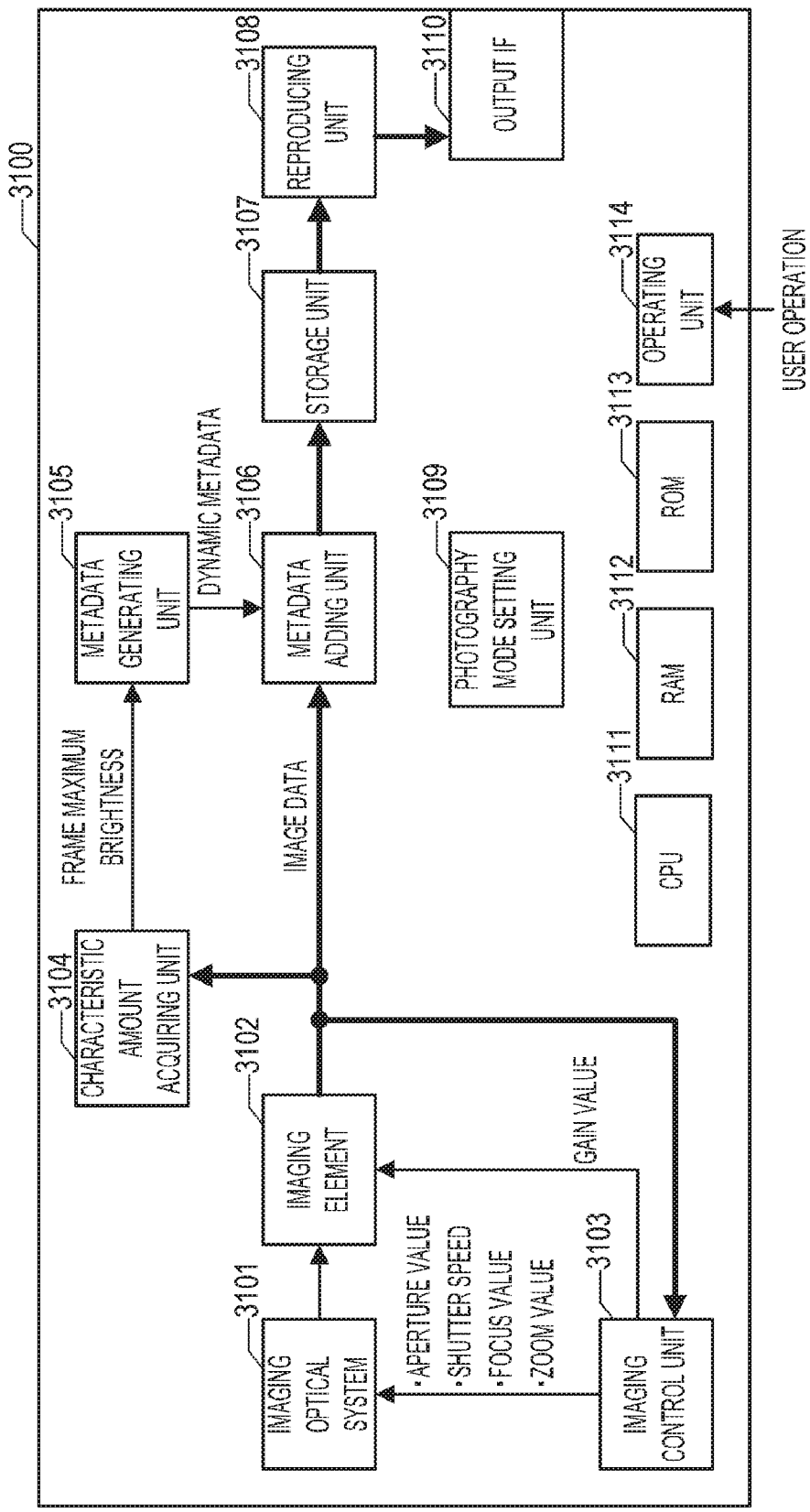
FIG. 16 is a block diagram showing a configuration example of the imaging apparatus according to the first embodiment.

A sixth embodiment of the present invention will be described below. FIG. 16 is a block diagram showing a configuration example of an imaging apparatus 3100 according to the present embodiment. The imaging apparatus 3100 includes an imaging optical system 3101, an imaging element 3102, an imaging control unit 3103, a characteristic amount acquiring unit 3104, a metadata generating unit 3105, a metadata adding unit 3106, a storage unit 3107, a reproducing unit 3108, a photography mode setting unit 3109, an output IF 3110, a CPU 3111, a RAM 3112, a ROM 3113, and an operating unit 3114. In the present embodiment, "imaging" or "capturing" refers to a process of generating image data of an image (a still image or a moving image) representing an object, and "photography" refers to a process of recording image data generated by imaging in the storage unit 3107.

The imaging optical system 3101 forms an optical image representing an object on the imaging element 3102 in a similar manner to the imaging optical system 1101 according to the first embodiment.

The imaging element 3102 captures a still image (an object image) representing the object and generates still image data representing the still image or captures a moving image (an object image) representing the object and generates moving image data representing the moving image. Specifically, the imaging element 3102 performs a photoelectric conversion process and an AD conversion process (analog-digital conversion process) in a similar manner to the imaging element 1102 according to the first embodiment. Subsequently, the imaging element 3102 outputs frame image data obtained by the AD conversion process to the characteristic amount acquiring unit 3104 and the metadata adding unit 3106. By repeating these processes, the imaging element 3102 sequentially outputs a plurality of frame image data respectively corresponding to a plurality of frames of a moving image.

The imaging control unit 3103 controls imaging conditions of the imaging apparatus 3100 in a similar manner to the imaging control unit 1103 according to the first embodiment.

The characteristic amount acquiring unit 3104 acquires a frame characteristic amount from frame image data in a similar manner to the characteristic amount acquiring unit 1104 according to the first embodiment. In the present embodiment, the characteristic amount acquiring unit 3104 acquires a frame maximum brightness and notifies the metadata generating unit 3105 of the acquired frame maximum brightness. In the present embodiment, the characteristic amount acquiring unit 3104 sequentially notifies a plurality of frame maximum brightnesses respectively corresponding to a plurality of frames of a captured moving image.

The metadata generating unit 3105 generates dynamic metadata indicating a characteristic amount of a captured moving image (a moving image to be photographed). In the present embodiment, the metadata generating unit 3105 generates dynamic metadata indicating, with respect to one or more scenes, a scene maximum brightness (a maximum brightness of one scene) of the captured moving image on the basis of the plurality of frame maximum brightnesses sequentially notified from the characteristic amount acquiring unit 3104. Alternatively, the metadata generating unit 3105 generates dynamic metadata indicating a frame maximum brightness of each frame of the captured moving image on the basis of the plurality of frame maximum brightnesses sequentially notified from the characteristic amount acquiring unit 3104. The metadata generating unit 3105 outputs the generated dynamic metadata to the metadata adding unit 3106.

While an example in which a characteristic amount indicated by dynamic metadata is a maximum brightness such as a frame maximum brightness or a scene maximum brightness will be described in the present embodiment, the characteristic amount is not limited to a maximum brightness. For example, the characteristic amount indicated by dynamic metadata may be another representative brightness (an average brightness, a minimum brightness, a modal brightness, an intermediate brightness, or the like) of one frame, one scene, or the like. The characteristic amount indicated by dynamic metadata may be a brightness histogram of one frame, one scene, or the like. The characteristic amount indicated by dynamic metadata may be a characteristic amount related to a color of one frame, one scene, or the like. The characteristic amount indicated by dynamic metadata may be a characteristic amount related to both a brightness and a color of one frame, one scene, or the like.

The metadata adding unit 3106 adds the dynamic metadata output from the metadata generating unit 3105 to the moving image data representing a captured moving image (a moving image to be photographed). The moving image data representing the captured moving image (the moving image to be photographed) is moving image data made up of a plurality of frame image data sequentially output from the imaging element 3102. For example, the metadata adding unit 3106 applies an encoding process on the basis of MPEG-4 AVC or HEVC (High Efficiency Video Coding) to the moving image data. In addition, the metadata adding unit 3106 adds the dynamic metadata to SEI (Supplemental Enhancement Information) in MPEG-4 AVC or HEVC. The metadata adding unit 3106 records the moving image data after adding the dynamic metadata thereto in the storage unit 3107.

The storage unit 3107 is a recording medium similar to the storage unit 1109 according to the first embodiment and stores the moving image data output from the metadata adding unit 3106 (the moving image data after adding the dynamic metadata thereto).

The reproducing unit 3108 reproduces the moving image data stored in the storage unit 3107. In the present embodiment, "reproduction" refers to a process of reading moving image data from the storage unit 3107 and outputting the read moving image data to outside of the imaging apparatus 3100 via the output IF 3110.

The photography mode setting unit 3109 sets a photography mode. In the present embodiment, the photography mode setting unit 3109 is connected via an internal bus (not illustrated) to other functional blocks of the imaging apparatus 3100. The photography mode setting unit 3109 changes setting values, processes, and the like of the other functional blocks of the imaging apparatus 3100 in accordance with the set photography mode. In the present embodiment, the photography mode setting unit 3109 changes a process of the metadata generating unit 3105 so that dynamic metadata indicating a characteristic amount of a moving image in a period in accordance with the set photography mode is generated. Accordingly, suitable dynamic metadata can be generated. Details will be provided later. For example, the photography mode setting unit 3109 sets a time-lapse photography mode, a continuous photography mode, a slow photography mode, or a moving image simultaneous photography mode.

The time-lapse photography mode is a photography mode in which a reproduction time of a moving image is shorter than a photography time of the moving image. For example, the time-lapse photography mode is a photography mode in which intermittent photography is performed and is a photography mode for photographing a time-lapse moving image to be reproduced at a higher speed than actual time. In the time-lapse photography mode, a moving image as though frames are decimated from a moving image photographed at an ordinary (standard) frame rate is photographed. In a moving image photographed in the time-lapse photography mode, a time variation of an object can be visually checked in a short period of time.

The imaging apparatus 3100 can also photograph and reproduce a still image. For example, the imaging apparatus 3100 can capture a still image, add metadata to still image data representing the still image, and record the still image data in the storage unit 3107. The continuous photography mode is a photography mode in which a plurality of still images are sequentially photographed. The reproducing unit 3108 can sequentially reproduce the plurality of still images photographed in the continuous photography mode (continuous reproduction).

The slow photography mode is a photography mode in which a reproduction time of a moving image is longer than a photography time of the moving image. For example, the slow photography mode is a photography mode in which photography is performed at a higher frame rate than an ordinary frame rate and is a photography mode for photographing a slow moving image to be reproduced at a lower speed than actual time.

The moving image simultaneous photography mode is a photography mode in which moving image data representing a moving image captured during a predetermined period is recorded linked with photography of a still image. For example, the moving image simultaneous photography mode is a photography mode in which a moving image is captured so that the moving image corresponding to a predetermined period of time up to the present timing is stored in the RAM 3112, and at a timing of photography of a still image, the moving image stored in the RAM 3112 is recorded in the storage unit 3107 together with the still image. Using the moving image simultaneous photography mode enables not only a still image but also a moving image corresponding to a predetermined period of time up to a timing of photography of the still image to be checked. Alternatively, a moving image after the timing of photography of the still image may be made checkable or a moving image corresponding to a period straddling the timing of photography of the still image may be made checkable.

The output IF 3110 outputs the moving image data stored in the storage unit 3107 (the moving image data after adding dynamic metadata thereto) to an external apparatus (not illustrated) in a similar manner to the output IF 1110 according to the first embodiment.

The CPU 3111, the RAM 3112, and the ROM 3113 are respectively configured in a similar manner to the CPU 1111, the RAM 1112, and the ROM 1113 according to the first embodiment.

The operating unit 3114 is configured in a similar manner to the operating unit 1114 according to the first embodiment. Function buttons (function icons to act as function buttons) also include a photography mode selection button for selecting and setting a photography mode and a reproduction start button for starting reproduction. The function buttons also include a setting button for designating and setting a photography frame rate (a frame rate of photography). The function buttons also include a setting button for designating and setting a reproduction frame rate (a frame rate of reproduction).

Figure 17:
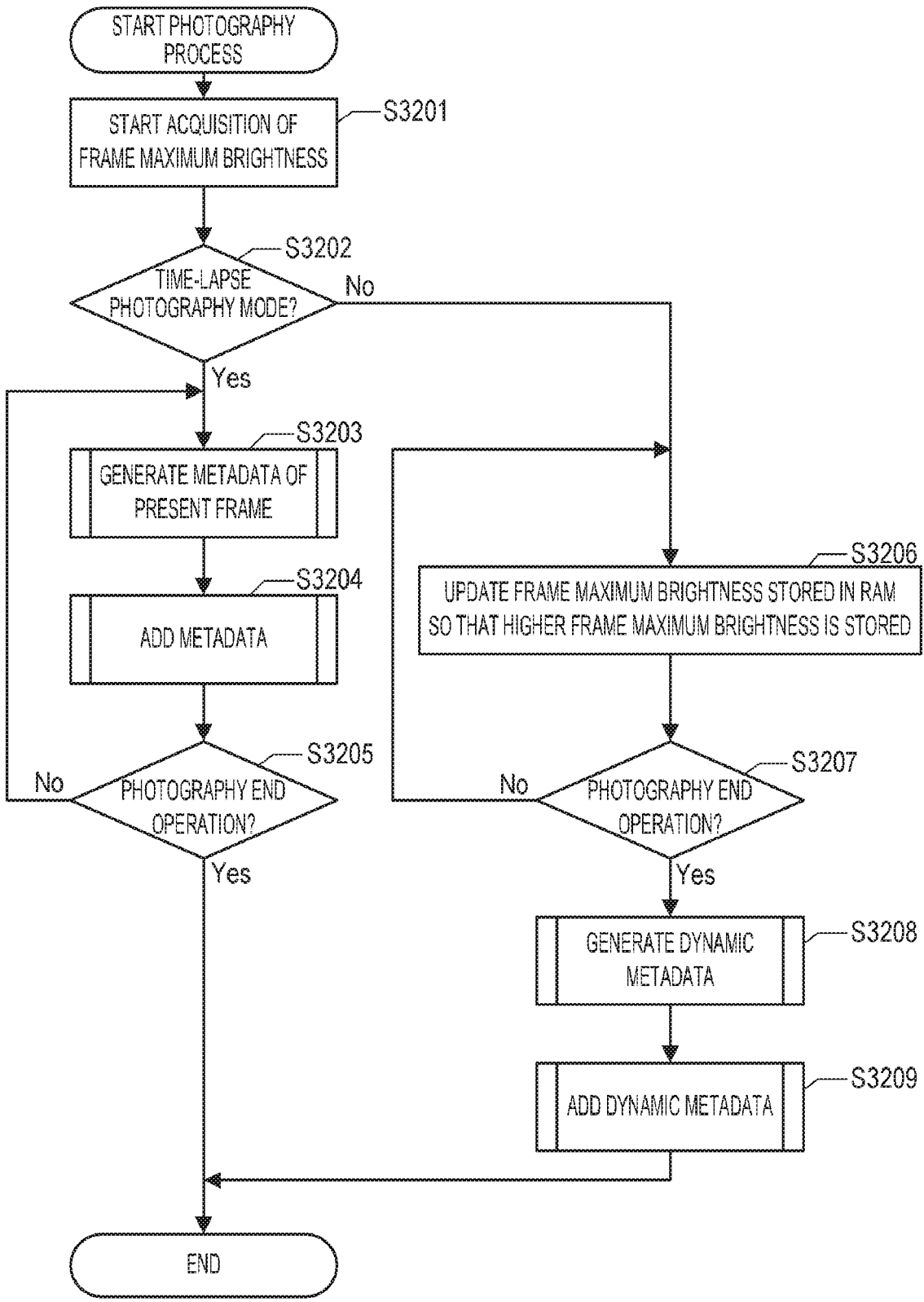
FIG. 17 is a flow chart showing an example of the photography process according to the first embodiment.

FIG. 17 is a flow chart showing an example of a photography process by the imaging apparatus 3100. When the CPU 3111 detects a photography start operation with respect to the operating unit 3114 in a state where a special photography mode is set, the photography process shown in FIG. 17 is started. Special photography mode is a general term for the time-lapse photography mode, the continuous photography mode, the slow photography mode, the moving image simultaneous photography mode, and the like. Hereinafter, it is assumed that a change of the photography mode is not permitted during the photography process.

Figure 18:
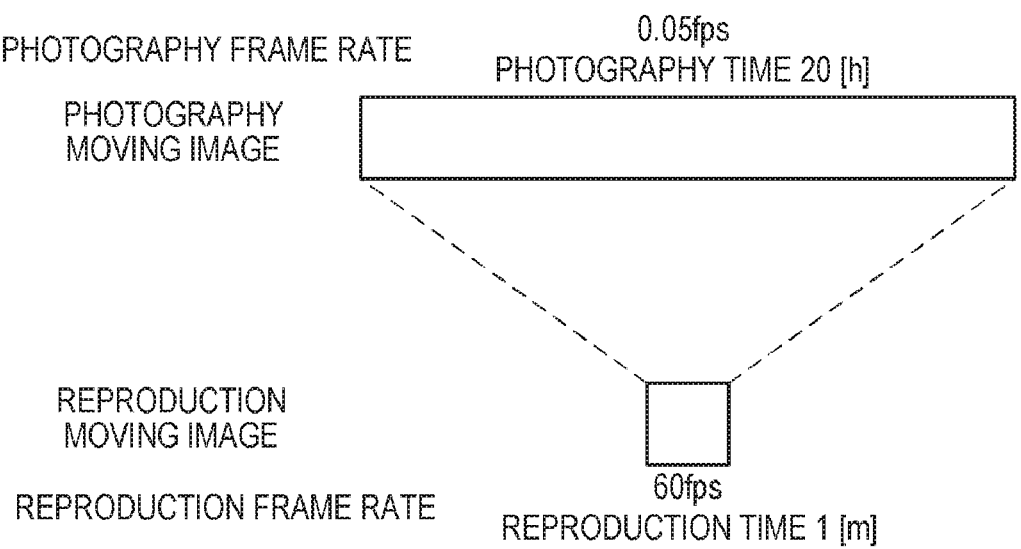
FIG. 18 is a schematic view showing an example of a time-lapse photography mode according to the first embodiment.

First, a case where photography is performed in the time-lapse photography mode will be described. FIG. 18 is a schematic view showing an example of a relationship between a photography frame rate and a reproduction frame rate in the time-lapse photography mode. The photography frame rate and the reproduction frame rate are set in accordance with a user operation with respect to the operating unit 3114. In the present embodiment, it is assumed that the photography frame rate is 0.05 fps, the reproduction frame rate is 60 fps, and a photography time is 20 hours. As shown in FIG. 18, from these conditions, a reproduction time is determined as 1 minute (60 seconds=72,000 seconds×0.05 fps/60 fps).

Before performing the photography start operation, with respect to the operating unit 3114, the user performs a setting operation for setting the time-lapse photography mode, a setting operation for setting the photography frame rate, and a setting operation for setting the reproduction frame rate. In addition, settings in accordance with the setting operations are made. For example, when the user performs a setting operation for designating 0.05 fps as the photography frame rate with respect to the operating unit 3114, the CPU 3111 sets 0.05 fps as an imaging frame rate representing an imaging period at which the imaging element 3102 captures images. Furthermore, the CPU 3111 also sets 0.05 fps as a recording frame rate representing a writing period at which the metadata adding unit 3106 writes frame image data into the storage unit 3107. It should be noted that the imaging frame rate may differ from the recording frame rate. For example, an ordinary frame rate such as 60 fps may be set as the imaging frame rate and 0.05 fps may be set as the recording frame rate. In this case, a captured moving image is recorded in the storage unit 3107 after decimating frames thereof (the photography frame rate is 0.05 fps).

In the photography process shown in FIG. 17, first, the characteristic amount acquiring unit 3104 starts acquisition of a frame maximum brightness of frame image data output from the imaging element 3102 (S3201).

Next, the CPU 3111 determines whether or not the photography mode set to the imaging apparatus 3100 is the time-lapse photography mode (S3202). When the photography mode is the time-lapse photography mode (S3202: Yes), the process is advanced to S3203, but when the photography mode is not the time-lapse photography mode (S3202: No), the process is advanced to S3206. In this case, since it is assumed that the time-lapse photography mode is set (S3202: Yes), the process is advanced to S3203.

In S3203, the metadata generating unit 3105 generates metadata indicating a frame maximum brightness of the present frame image data as the metadata of the frame image data. Next, the metadata adding unit 3106 adds the metadata output from the metadata generating unit 3105 (the metadata generated in S3203) to the frame image data output from the imaging element 3102 (the present frame image data) (S3204). In addition, the metadata adding unit 3106 records the frame image data after adding the metadata thereto in the storage unit 3107. The processes of S3203 and S3204 are to be repeated during photography. Therefore, in the case of the time-lapse photography mode, dynamic metadata indicating a characteristic amount (a frame maximum brightness) of each frame of the captured moving image (the moving image to be photographed) is generated and added to moving image data representing the captured moving image (the moving image to be photographed). It should be noted that the metadata adding unit 3106 performs an encoding process of frame image data when appropriate as described above.

Subsequently, the CPU 3111 determines whether or not a photography end operation with respect to the operating unit 3114 has been performed (S3205). When a photography end operation has not been performed (S3205: No), the process is returned to S3203. The processes of S3203 to S3205 are repeated at the photography frame rate until a photography end operation is performed. In other words, the processes of S3203 to S3205 are performed for each frame of the captured moving image (the moving image to be photographed). When a photography end operation has been performed (S3205: Yes), the photography process shown in FIG. 17 is ended. In this case, it is assumed that the processes of S3203 to S3205 had been repeated until 20 hours had elapsed from the start of photography (the start of the photography process shown in FIG. 17) and that a photography end operation had been performed once 20 hours had elapsed to end the photography process.

Figure 19:
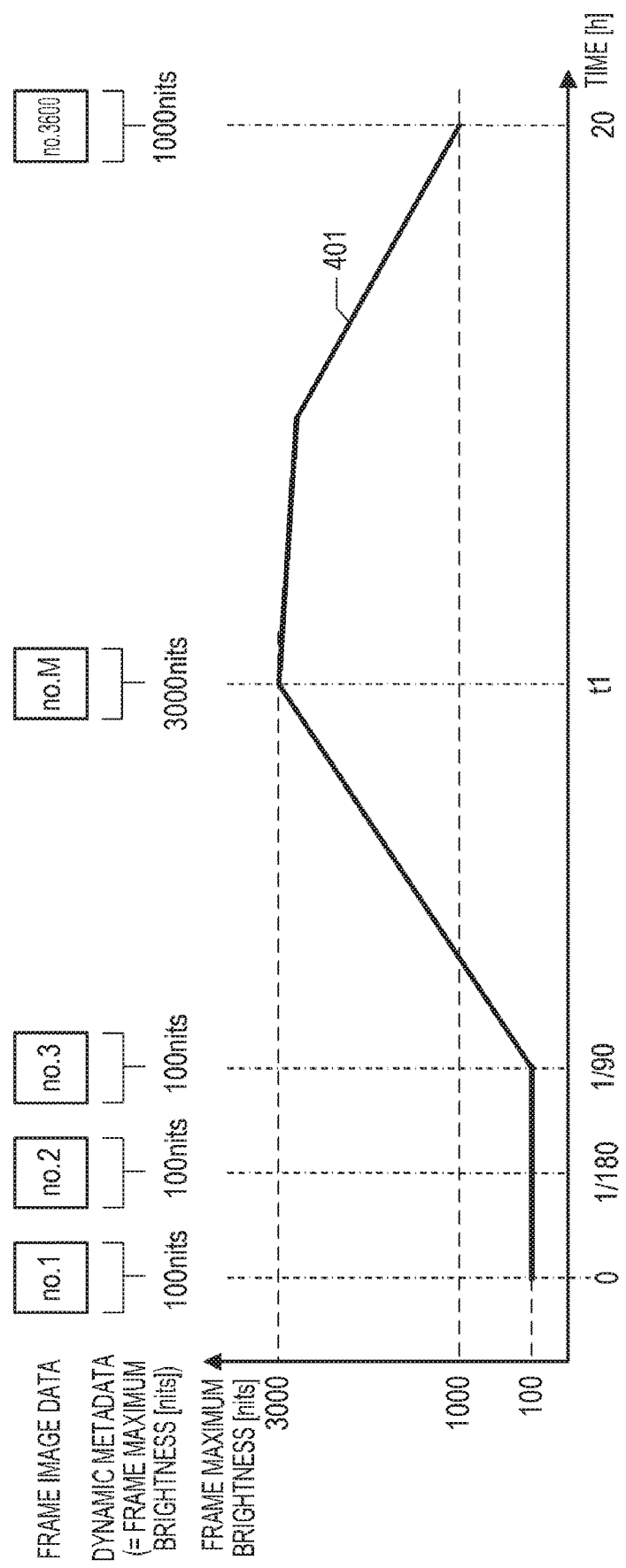
FIG. 19 is a schematic view showing an example of dynamic metadata according to the first embodiment.

FIG. 19 is a schematic view showing an example of frame image data, a frame maximum brightness, and dynamic metadata of a moving image photographed in the time-lapse photography mode. Since the photography time is 20 hours and the photography frame rate is 0.05 fps, 3600 (=0.05 fps×72,000 seconds) frame images are photographed (frame image data no. 1 to no. 3600). A solid line 3401 indicates a time variation of the frame maximum brightness. As shown in FIG. 19, when a moving image is photographed in the time-lapse photography mode, metadata indicating a corresponding frame maximum brightness is added to each of the frame image data no. 1 to no. 3600. For example, metadata indicating 100 nits is added to the frame image data no. 1 to no. 3. In addition, metadata indicating 3000 nits is added to the frame image data no. M, and metadata indicating 1000 nits is added to the frame image data no. 3600. In other words, dynamic metadata indicating a characteristic amount (a frame maximum brightness) of each frame of the captured moving image (the moving image to be photographed) is generated and added to moving image data representing the captured moving image (the moving image to be photographed).

While an example of setting the photography frame rate and the reproduction frame rate has been described, other parameters related to a frame rate (the photography frame rate, the reproduction frame rate, or the like) may be set. For example, a photography time (seconds) and the number of frames to be photographed may be set. In this case, the photography frame rate is obtained by dividing the number of frames to be photographed by the photography time.

It should be noted that when the continuous photography mode is set or, more specifically, when continuous reproduction (a process of sequentially reproducing a plurality of still images) is to be performed after continuous photography (a process of sequentially photographing a plurality of still images), a photography process similar to when the time-lapse photography mode is set may be applied. Specifically, the metadata generating unit 3105 may perform a process of generating metadata indicating a characteristic amount of a captured still image for each of a plurality of still images to be sequentially photographed. In addition, the metadata adding unit 3106 may perform a process of adding metadata generated by the metadata generating unit 3105 to still image data representing the still image corresponding to the metadata for each of a plurality of still images to be sequentially photographed.

In this case, for example, the still image data is recorded in EXIF (Exchangeable image file format). In addition, a characteristic amount (a maximum brightness) of a still image is described in metadata specified in EXIF. These are processes performed during photography. Subsequently when sequentially reading a plurality of still image data (a plurality of still images) from the storage unit 3107, the reproducing unit 3108 extracts a characteristic amount (a maximum brightness) from the metadata specified in EXIF and outputs the characteristic amount together with the still image data to the output IF 3110. The output IF 3110 outputs the still image data output from the reproducing unit 3108 to an external apparatus in a stream format compliant with the HDMI standard. In other words, the still image data is output as a part (frame image data) of moving image data. At this point, the metadata (a characteristic amount; a maximum brightness) output from the reproducing unit 3108 is also output to the external apparatus as a part (a frame maximum brightness) of dynamic metadata specified in SMPTE ST 2094. These are processes performed during reproduction.

According to the processes described above, even when performing continuous reproduction after continuous photography, dynamic metadata indicating a characteristic amount (a frame maximum brightness) of each frame of a moving image can be generated and added to moving image data.

Figure 20:
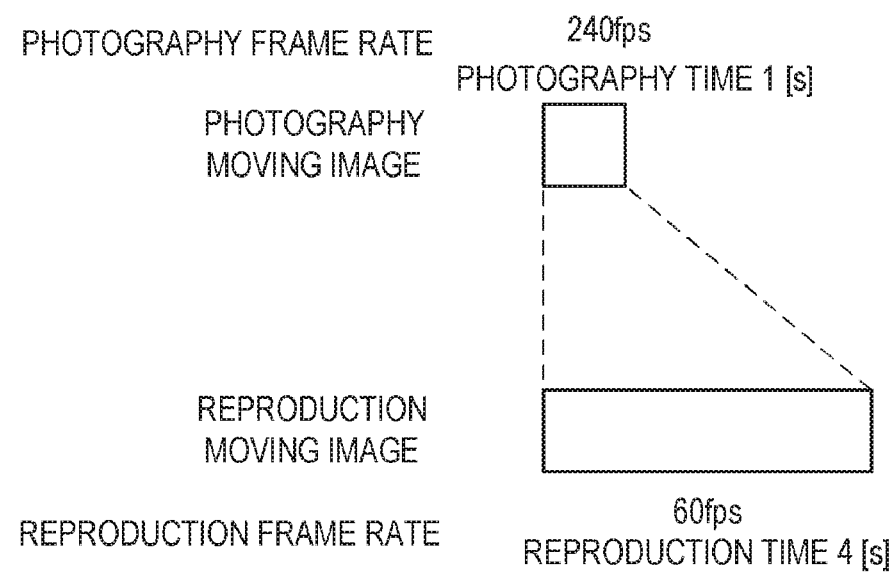
FIG. 20 is a schematic view showing an example of a slow photography mode according to the first embodiment.

Next, a case where photography is performed in the slow photography mode will be described. FIG. 20 is a schematic view showing an example of a relationship between a photography frame rate and a reproduction frame rate in the slow photography mode. The photography frame rate and the reproduction frame rate are set in accordance with a user operation with respect to the operating unit 3114 in a similar manner to when performing photography in the time-lapse photography mode. In the present embodiment, it is assumed that the photography frame rate is 240 fps, the reproduction frame rate is 60 fps, and a photography time is 1 second. As shown in FIG. 20, from these conditions, a reproduction time is determined as 4 seconds (=1 second×240 fps÷60 fps).

In the photography process shown in FIG. 17, first, processes of S3201 and S3202 are performed in a similar manner to when performing photography in the time-lapse photography mode. In other words, in S3201, the characteristic amount acquiring unit 3104 starts acquisition of a frame maximum brightness of frame image data output from the imaging element 3102. In addition, in S3202, the CPU 3111 determines whether or not the photography mode set to the imaging apparatus 3100 is the time-lapse photography mode. In this case, since it is assumed that the time-lapse photography mode is not set but the slow photography mode is set instead (S3202: No), the process is advanced to S3206.

In S3206, the CPU 3111 determines whether or not the frame maximum brightness of the present frame image data is higher than the frame maximum brightness (information) stored in the RAM 3112. In addition, when the CPU 3111 determines that the frame maximum brightness of the present frame image data is higher, the CPU 3111 updates the frame maximum brightness stored in the RAM 3112 with the frame maximum brightness of the present frame image data. When the present frame image data corresponds to a first frame of a captured moving image (a moving image to be photographed), the CPU 3111 records the frame maximum brightness of the present frame image data in the RAM 3112.

In addition, the CPU 3111 determines whether or not a photography end operation with respect to the operating unit 3114 has been performed (S3207). When a photography end operation has not been performed (S3207: No), the process is returned to S3206. The processes of S3206 and S3207 are repeated at the photography frame rate until a photography end operation is performed. In other words, the processes of S3206 and S3207 are performed for each frame of the captured moving image (the moving image to be photographed). When a photography end operation has been performed (S3207: Yes), the process is advanced to S3208. Therefore, the process is advanced to S3208 in a state where a characteristic amount (a maximum brightness) of the entire captured moving image (the moving image to be photographed) is stored in the RAM 3112 or, in other words, a state where a scene maximum brightness when an entire period of a moving image is considered to be one scene is stored in the RAM 3112. In this case, it is assumed that the processes of S3206 and S3207 had been repeated until 1 second had elapsed from the start of photography (the start of the photography process shown in FIG. 17) and that a photography end operation had been performed once 1 second had elapsed to advance the process to S3208.

In S3208, the metadata generating unit 3105 generates, as dynamic metadata, metadata indicating the frame maximum brightness stored in the RAM 3112 (a maximum brightness of an entire moving image; a scene maximum brightness when an entire period of a moving image is considered to be one scene).

Subsequently, the metadata adding unit 3106 adds the dynamic metadata output from the metadata generating unit 3105 (the dynamic metadata generated in S3208) to the moving image data output from the imaging element 3102 (S3209). In addition, the metadata adding unit 3106 records the moving image data after adding the dynamic metadata thereto in the storage unit 3107. Subsequently, the photography process ends. As described earlier, the metadata adding unit 3106 performs an encoding process of the moving image data when appropriate as described above.

Figure 21:
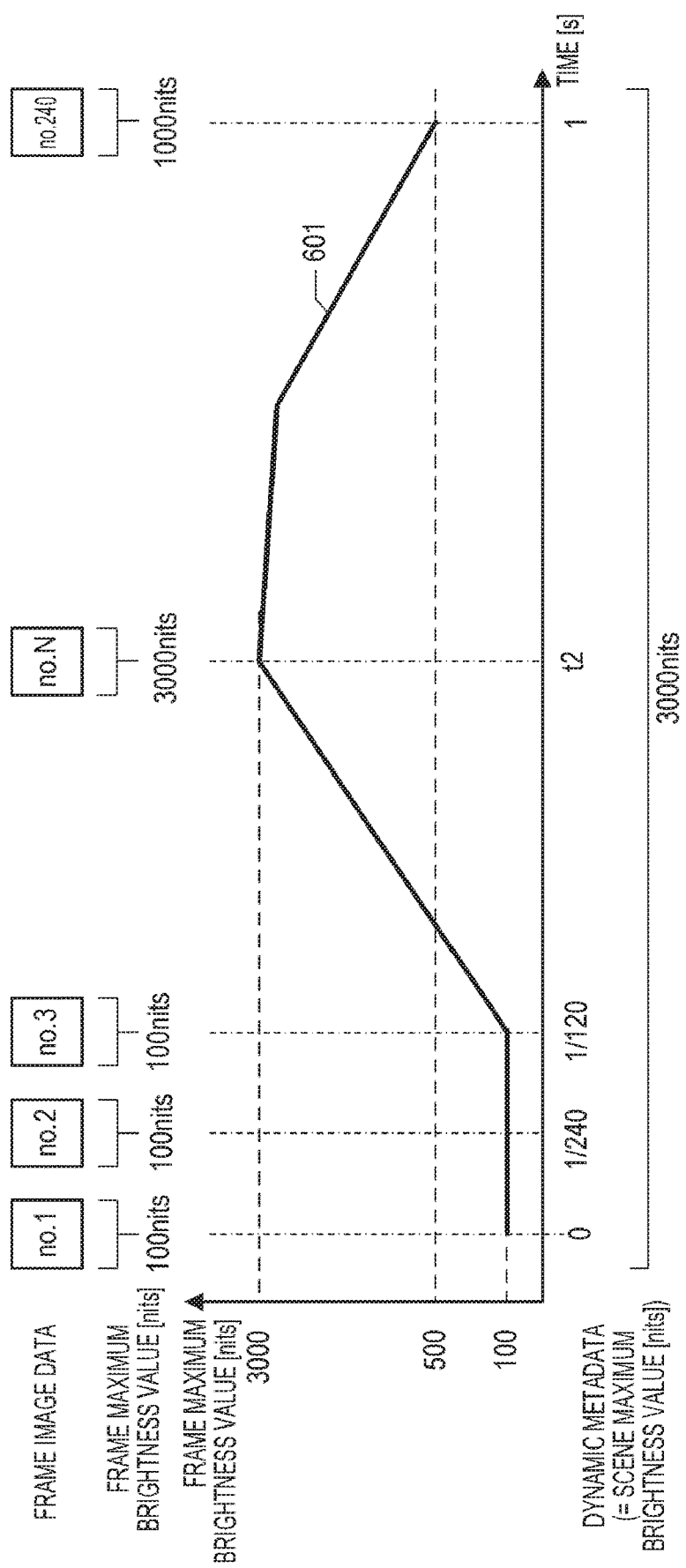
FIG. 21 is a schematic view showing an example of dynamic metadata according to the first embodiment.

FIG. 21 is a schematic view showing an example of frame image data, a frame maximum brightness, and dynamic metadata of a moving image photographed in the slow photography mode. Since the photography time is 1 second and the photography frame rate is 240 fps, 240 (=240 fps×1 second) frame images are photographed (frame image data no. 1 to no. 240). A solid line 3601 indicates a time variation of the frame maximum brightness. As shown in FIG. 21, when a moving image is photographed in the slow photography mode, unique dynamic metadata indicating a maximum brightness among a plurality of frame maximum brightnesses respectively corresponding to the plurality of frame image data is added to moving image data so as to correspond to all of the frame image data. Specifically, dynamic metadata indicating a frame maximum brightness 3000 nits of frame image data no. N is added to moving image data as dynamic metadata corresponding to all of the frame image data no. 1 to no. 240. In other words, dynamic metadata indicating a characteristic amount (a maximum brightness) of the entire captured moving image (the moving image to be photographed) is generated and added to moving image data representing the captured moving image (the moving image to be photographed).

It should be added that when the moving image simultaneous photography mode is set, a photography process similar to when the slow photography mode is set may be applied. However, in the case of the moving image simultaneous photography mode, in S3206, the CPU 3111 records present frame image data in the RAM 3112 so that moving image data (a plurality of frame image data) corresponding to a predetermined time up to the present timing is stored in the RAM 3112. Furthermore, the CPU 3111 records a frame maximum brightness corresponding to the present frame image data in the RAM 3112 so that a plurality of frame maximum brightnesses respectively corresponding to the plurality of frame image data are stored in the RAM 3112. In S3207, the CPU 3111 determines whether or not photography of a still image has been performed. Photography of a still image is performed in accordance with, for example, a depression of a still image photography button. Subsequently, in S3208, the metadata generating unit 3105 generates, as dynamic metadata, metadata indicating a maximum brightness among the plurality of frame maximum brightnesses stored in the RAM 3112.

Figure 22:
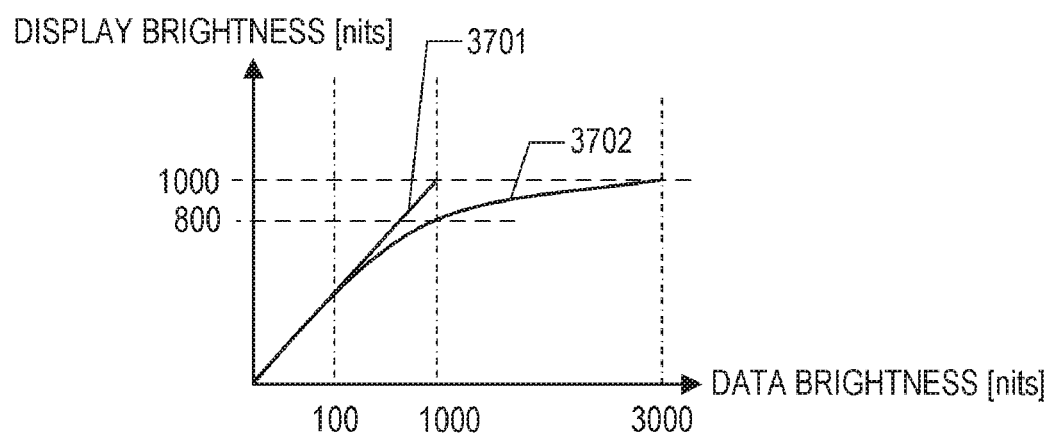
FIG. 22 is a schematic view showing an example of a tone curve according to the first embodiment.

FIG. 22 is a schematic view showing an example of a tone curve (a tone map) in a case where an upper limit of a display apparatus (a brightness of a display surface) of a display apparatus according to the present embodiment is set to 1000 nits. The tone curve represents a relationship between a brightness (a data brightness) represented by image data input to the display apparatus and a display brightness of the display apparatus. The display apparatus displays an image in accordance with the tone curve. In the present embodiment, frame image data output from the imaging apparatus 3100 (the output IF 3110) is input to the display apparatus. The display apparatus changes the tone curve in accordance with dynamic metadata output from the imaging apparatus 3100.

When using a tone curve 3701, while a data brightness 1000 nits is displayed at a display brightness 1000 nits, a data brightness that is higher than 1000 nits is also displayed at the display brightness 1000 nits. In other words, while a data brightness that is equal to or lower than 1000 nits can be faithfully displayed, a data brightness that is higher than 1000 nits cannot be displayed with high gradation properties and gradation loss (blown-out highlights) occurs in an area of data brightness that is higher than 1000 nits. When using a tone curve 3702, while a decline in brightness occurs such as displaying a data brightness 1000 nits at a display brightness 800 nits, a data brightness that is higher than 1000 nits can be displayed with high gradation properties.

As described earlier, when the time-lapse photography mode is set, dynamic metadata indicating a frame maximum brightness of each frame of a moving image is generated. Therefore, in the display apparatus, a tone curve is changed for each frame. For example, when displaying frame image data no. M (frame maximum brightness 3000 nits) shown in FIG. 22, the tone curve 3702 is used. In addition, when displaying frame image data no. 3600 (frame maximum brightness 1000 nits) shown in FIG. 22, the tone curve 3701 is used. By changing the tone curve to be used from the tone curve 3702 to the tone curve 3701, the decline in brightness described above (in particular, a variation from a data brightness of 100 nits or higher, a decline from a data brightness near 1000 nits, and the like) can be suppressed. Furthermore, by changing the tone curve to be used from the tone curve 3701 to the tone curve 3702, a data brightness that is higher than 1000 nits can be displayed with high gradation properties.

On the other hand, when the slow photography mode is set, dynamic metadata indicating a scene maximum brightness when an entire period of a moving image is considered to be one scene is generated. Therefore, in the display apparatus, a tone curve is not changed. In the example shown in FIG. 21, since dynamic metadata indicating a scene maximum brightness 3000 nits is generated, the tone curve 3702 is always used in the display apparatus. As a result, a brightness variation attributable to a variation in the tone curve can be suppressed. In a moving image photographed in the slow photography mode, a difference in images between frames is relatively small. By suppressing a brightness variation attributable to a variation in the tone curve, an abrupt variation in an appearance of images between frames with a relatively small difference in the images can be suppressed.

As described above, according to the present embodiment, in an imaging apparatus, dynamic metadata is generated so as to indicate a characteristic amount of a moving image in a period in accordance with a set photography mode and the generated dynamic metadata is added to moving image data. Accordingly, moving image data to which suitable dynamic metadata has been added can be obtained in a photographing process (the imaging apparatus) instead of post-production (an image data editing process). For example, by using the dynamic metadata added in the present embodiment, a time-lapse moving image can be displayed while suppressing a decline in brightness in a high brightness area having a brightness near a frame maximum brightness. A slow moving image can also be displayed while suppressing an abrupt variation in brightness.

It should be noted that photography modes are not limited to the time-lapse photography mode, the continuous photography mode, the slow photography mode, and the moving image simultaneous photography mode. For example, a photography mode in which a photography frame rate can be changed during photography may be made settable. When such a photography mode is set, the metadata generating unit 3105 may generate dynamic metadata in which a period corresponding to a characteristic amount changes at a timing where the photography frame rate is changed. In other words, the metadata generating unit 3105 may generate dynamic metadata indicating each scene maximum brightness while adopting a timing where the photography frame rate is changed as a timing of a scene change.

In addition, the metadata generating unit 3105 may generate dynamic metadata so that, with respect to a period in which the photography frame rate is lower than a predetermined frame rate, a characteristic amount (a frame maximum brightness) of each frame of a moving image is indicated instead of a scene maximum brightness. For example, the predetermined frame rate is an ordinary frame rate such as 60 fps.

Furthermore, the metadata generating unit 3105 may generate dynamic metadata so that, with respect to a period in which the photography frame rate is higher than the predetermined frame rate, a period corresponding to the characteristic amount changes at a timing of a scene change of a moving image. In other words, the metadata generating unit 3105 may generate dynamic metadata so that, with respect to a period in which the photography frame rate is higher than the predetermined frame rate, each scene maximum brightness is indicated. Timings of a scene change may include a timing that differs from a timing where the photography frame rate has been changed. For example, a timing where the frame maximum brightness varies between frames by an amount equal to or larger than a threshold may be further used as a timing of a scene change.

Alternatively, the metadata generating unit 3105 may generate dynamic metadata so that, with respect to a period in which the photography frame rate is higher than the predetermined frame rate, a period corresponding to the characteristic amount changes at a predetermined frame rate. In other words, the metadata generating unit 3105 may generate dynamic metadata indicating each scene maximum brightness while adopting a timing where the photography frame rate has been changed and a timing of a predetermined frame rate as timings of a scene change.

Seventh Embodiment

A seventh embodiment of the present invention will be described below. In the sixth embodiment, an example has been described in which a reproduction time (a reproduction frame rate) is set in advance. In the seventh embodiment, an example in which the reproduction time can be changed when performing reproduction will be described. Hereinafter, points (configurations, processes, and the like) that differ from those of the sixth embodiment will be described in detail and descriptions of points that are the same as those of the sixth embodiment will be omitted.

The photography mode setting unit 3109 is capable of setting a variable frame rate photography mode (a photography mode in which a photography frame rate can be changed). When the variable frame rate mode is set, a switch from ordinary photography to special photography, a switch from special photography to another special photography, a switch from special photography to ordinary photography, or the like is performed in accordance with a user operation with respect to the operating unit 3114. Special photography is the same as photography in the special photography mode, and examples include time-lapse photography that is photography in the time-lapse photography mode and slow photography that is photography in the slow photography mode.

In addition to the processes described in the sixth embodiment, the reproducing unit 3108 can also perform a scene determination process of determining a scene of a moving image, a regeneration process of regenerating (updating) dynamic metadata, and the like. In the scene determination process, for example, a timing where a frame maximum brightness varies between frames by an amount equal to or larger than a threshold is detected as a timing of a scene change. Furthermore, the reproducing unit 3108 can set a reproduction mode in accordance with a user operation with respect to the operating unit 3114. In the present embodiment, the reproducing unit 3108 sets a special effect priority mode or a time priority mode when reproducing a moving image photographed in the variable frame rate photography mode. The special effect priority mode and the time priority mode will be described later.

A regeneration process of dynamic metadata in accordance with the regeneration mode of the imaging apparatus 3100 will be described. In this case, it is assumed that moving image data photographed in the variable frame rate photography mode is to be reproduced and dynamic metadata indicating a frame maximum brightness of each frame has been added to the moving image data to be reproduced.

First, a case where the special effect priority mode is set will be described. The special effect priority mode is a reproduction mode in which reproduction prioritizing an effect of special photography is performed. When the special effect priority mode is set, a moving image photographed in the variable frame rate photography mode is reproduced over a reproduction time that differs from a photography time of the moving image. For example, the moving image is reproduced over a reproduction time that is longer than the photography time with respect to a period of slow photography (slow reproduction) but the moving image is reproduced over a reproduction time that is shorter than the photography time with respect to a period of time-lapse photography (time-lapse reproduction).

Figure 23:
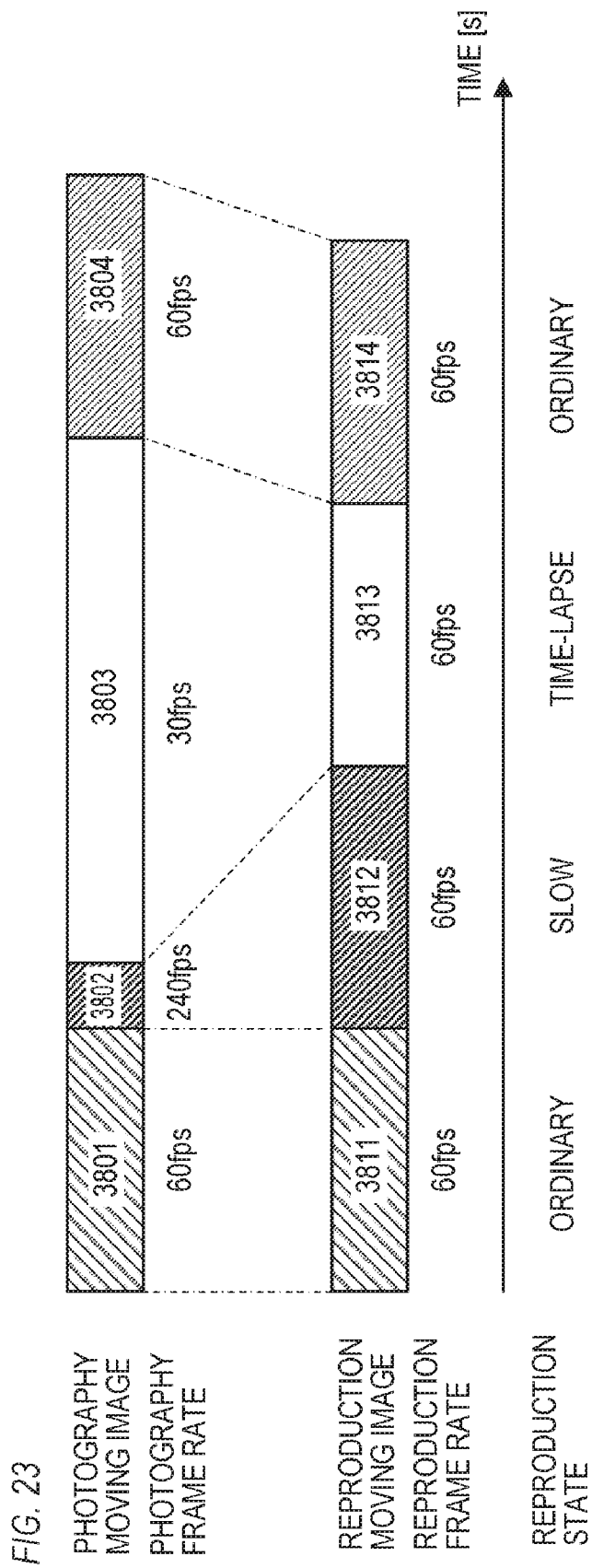
FIG. 23 is a schematic view showing an example of a special effect priority mode according to the second embodiment.

FIG. 23 is a schematic view showing an example of a relationship among a photography frame rate, a reproduction frame rate, and a reproduction state in a case where the special effect priority mode is set.

In FIG. 23, a moving image photographed in the variable frame rate photography mode is made up of an ordinary photography moving image 3801, a slow photography moving image 3802, a time-lapse photography moving image 3803, and an ordinary photography moving image 3804. The ordinary photography moving images 3801 and 3804 are moving images obtained by ordinary photography and a photography frame rate of the ordinary photography moving images 3801 and 3804 is 60 fps. The slow photography moving image 3802 is a moving image obtained by slow photography and a photography frame rate of the slow photography moving image 3802 is 240 fps. The time-lapse photography moving image 3803 is a moving image obtained by time-lapse photography and a photography frame rate of the time-lapse photography moving image 3803 is 30 fps.

When the special effect priority mode is set, ordinary reproduction of the ordinary photography moving image 3801 is performed, slow reproduction of the slow photography moving image 3802 is performed, time-lapse reproduction of the time-lapse photography moving image 3803 is performed, and ordinary reproduction of the ordinary photography moving image 3804 is performed. In the example shown in FIG. 23, a reproduction moving image (a moving image that is reproduced) is made up of an ordinary reproduction moving image 3811, a slow reproduction moving image 3812, a time-lapse reproduction moving image 3813, and an ordinary reproduction moving image 3814. The ordinary reproduction moving image 3811 corresponds to the ordinary photography moving image 3801, the slow reproduction moving image 3812 corresponds to the slow photography moving image 3802, the time-lapse reproduction moving image 3813 corresponds to the time-lapse photography moving image 3803, and the ordinary reproduction moving image 3814 corresponds to the ordinary photography moving image 3804. In addition, the reproduction frame rate is always set to 60 fps.

Figure 24:
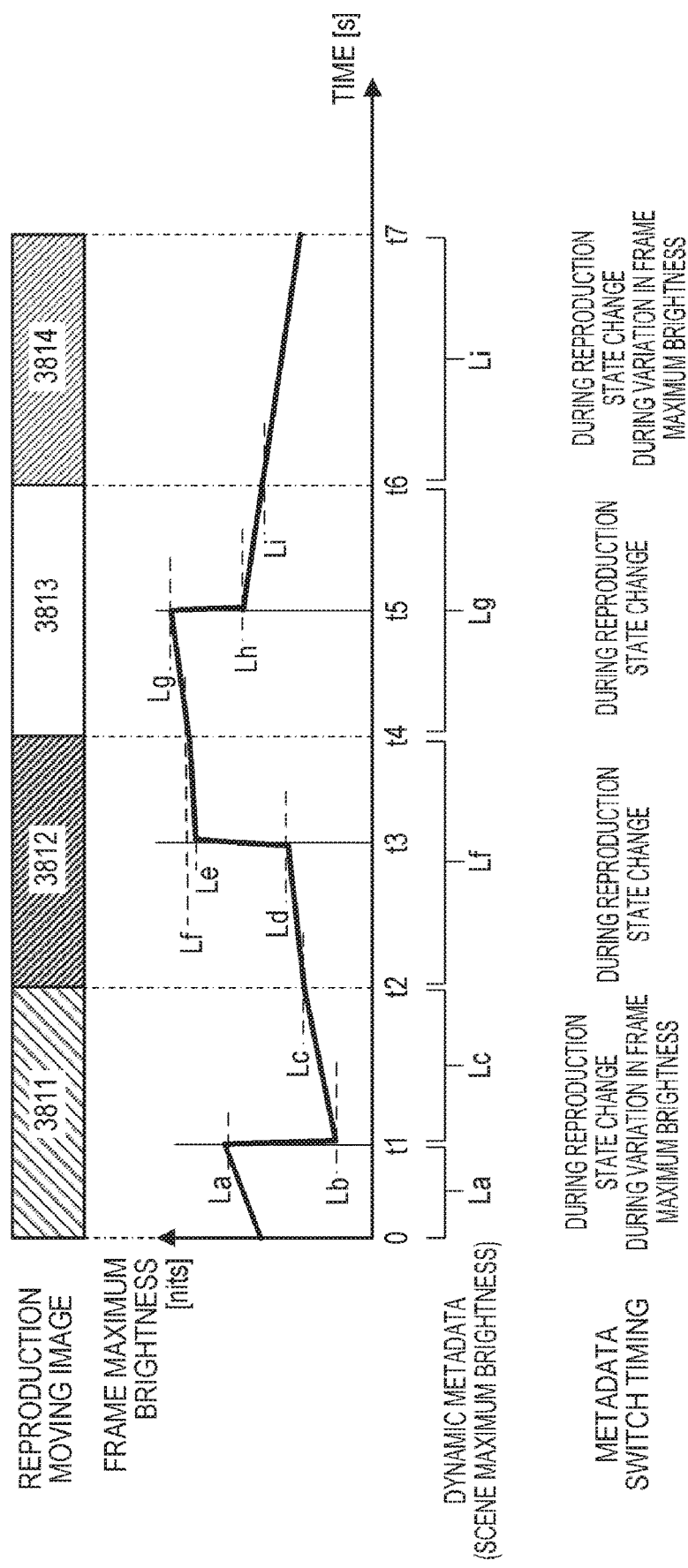
FIG. 24 is a schematic view showing an example of dynamic metadata according to the second embodiment.

FIG. 24 is a schematic view showing an example of regenerated dynamic metadata in a case where the special effect priority mode is set. In this case, a difference between a frame maximum brightness La and a frame maximum brightness Lb, a difference between a frame maximum brightness Ld and a frame maximum brightness Le, and a difference between a frame maximum brightness Lg and a frame maximum brightness Lh are equal to or larger than the threshold described earlier for detecting a scene change. A case where the special effect priority mode is set is a case where a moving image photographed in the variable frame rate photography mode is reproduced over a reproduction time that differs from a photography time of the moving image.

When the special effect priority mode is set, the reproducing unit 3108 regenerates dynamic metadata so as to satisfy the following conditions. In this case, a timing where a scene of a moving image changes is not a timing where the photography frame rate has been changed but, for example, a timing where the frame maximum brightness varies by an amount equal to or larger than a threshold. A timing where the photography frame rate has been changed is a timing where a reproduction state changes.

- In a period in which the photography frame rate is a predetermined frame rate (for example, an ordinary frame rate such as 60 fps), a period corresponding to a characteristic amount is changed at a timing where a scene of a moving image changes and at a timing where the photography frame rate has been changed.
- In a period in which the photography frame rate is not a predetermined frame rate, a period corresponding to a characteristic amount is changed at a timing where the photography frame rate has been changed.

In the present embodiment, with respect to a period of ordinary reproduction, dynamic metadata is regenerated so as to indicate a scene maximum brightness with a timing where the photography frame rate has been changed and a timing where the frame maximum brightness varies by an amount equal to or larger than a threshold as timings of scene change. Specifically, among a period of the ordinary reproduction moving image 3811, a period from a time point 0 where reproduction is started to a time point t1 where the frame maximum brightness varies from a brightness La to a brightness Lb is detected as a period of one scene. In addition, as a part of dynamic metadata to be regenerated or, more specifically, metadata corresponding to the detected scene (the period from the time point 0 to the time point t1), metadata indicating the scene maximum brightness La of the scene is regenerated. In a similar manner, a period from the time point t1 to a time point t2 where a reproduction state varies is detected as one scene and metadata indicating a scene maximum brightness Lc of the scene is regenerated as metadata corresponding to the detected scene. With respect to a period of the ordinary reproduction moving image 3814, a period from a time point t6 where the reproduction state varies to a time point t7 where reproduction is ended is detected as a period of one scene. In addition, as metadata corresponding to the detected scene (the period from the time point t6 to the time point t7), metadata indicating a scene maximum brightness Li of the scene is regenerated.

Furthermore, with respect to a period of special reproduction (slow reproduction, time-lapse reproduction, or the like), dynamic metadata is generated so as to indicate a characteristic amount of an entire moving image in the period. In other words, with respect to a period of special reproduction, dynamic metadata is regenerated so as to indicate a scene maximum brightness when the period is considered to be one scene.

Specifically, with respect to a period of the slow reproduction moving image 3812, a period from the time point t2 where slow reproduction is started to a time point t4 where a reproduction state varies is detected as one scene. In addition, as a part of dynamic metadata to be regenerated or, more specifically, metadata corresponding to the detected scene (the period from the time point t2 to the time point t4), metadata indicating a scene maximum brightness Lf of the scene is regenerated. While metadata is changed at a time point t3 where the frame maximum brightness varies from a brightness Ld to a brightness Le in the case of ordinary reproduction, metadata is not changed at the time point t3 in the case of slow reproduction.

In a similar manner, with respect to a period of the time-lapse reproduction moving image 3813, a period from the time point t4 where time-lapse reproduction is started to the time point t6 where a reproduction state varies is detected as one scene. In addition, as metadata corresponding to the detected scene (the period from the time point t4 to the time point t6), metadata indicating a scene maximum brightness Lg of the scene is regenerated. While metadata is changed at a time point t5 where the frame maximum brightness varies from the brightness Lg to a brightness Lh in the case of ordinary reproduction, metadata is not changed at the time point t5 in the case of time-lapse reproduction.

By using dynamic metadata regenerated by the process described above, since a tone curve is not changed during special reproduction, (an abrupt) brightness variation attributable to a variation in the tone curve can be suppressed.

Next, a case where the time priority mode is set will be described. The time priority mode is a reproduction mode in which reproduction prioritizing photography time is performed. When the time priority mode is set, a moving image photographed in the variable frame rate photography mode is reproduced over a reproduction time that is equal to a photography time of the moving image.

Figure 25:
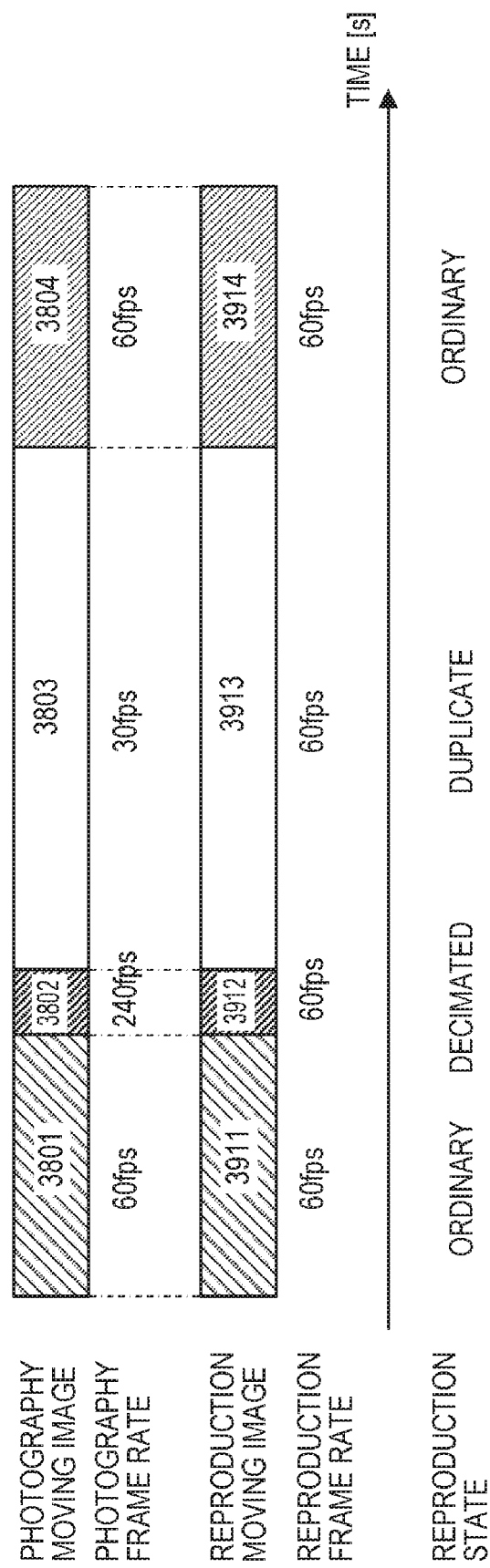
FIG. 25 is a schematic view showing an example of a time priority mode according to the second embodiment.

FIG. 25 is a schematic view showing an example of a relationship among a photography frame rate, a reproduction frame rate, and a reproduction state in a case where the time priority mode is set. In a similar manner to FIG. 23, a moving image photographed in the variable frame rate photography mode is made up of the ordinary photography moving image 3801, the slow photography moving image 3802, the time-lapse photography moving image 3803, and the ordinary photography moving image 3804.

When the time priority mode is set, ordinary reproduction of the ordinary photography moving image 3801 is performed, decimated reproduction of the slow photography moving image 3802 is performed, duplicate reproduction of the time-lapse photography moving image 3803 is performed, and ordinary reproduction of the ordinary photography moving image 3804 is performed. In the decimated reproduction, frames are decimated so that the reproduction time equals the photography time. In the duplicate reproduction, same frames are reproduced a plurality of times so that the reproduction time equals the photography time. In the example shown in FIG. 25, a reproduction moving image is made up of an ordinary reproduction moving image 3911, a decimated reproduction moving image 3912, a duplicate reproduction moving image 3913, and an ordinary reproduction moving image 3914. The ordinary reproduction moving image 3911 corresponds to the ordinary photography moving image 3801, the decimated reproduction moving image 3912 corresponds to the slow photography moving image 3802, the duplicate reproduction moving image 3913 corresponds to the time-lapse photography moving image 3803, and the ordinary reproduction moving image 3914 corresponds to the ordinary photography moving image 3804. In addition, the reproduction frame rate is always set to 60 fps.

Figure 26:
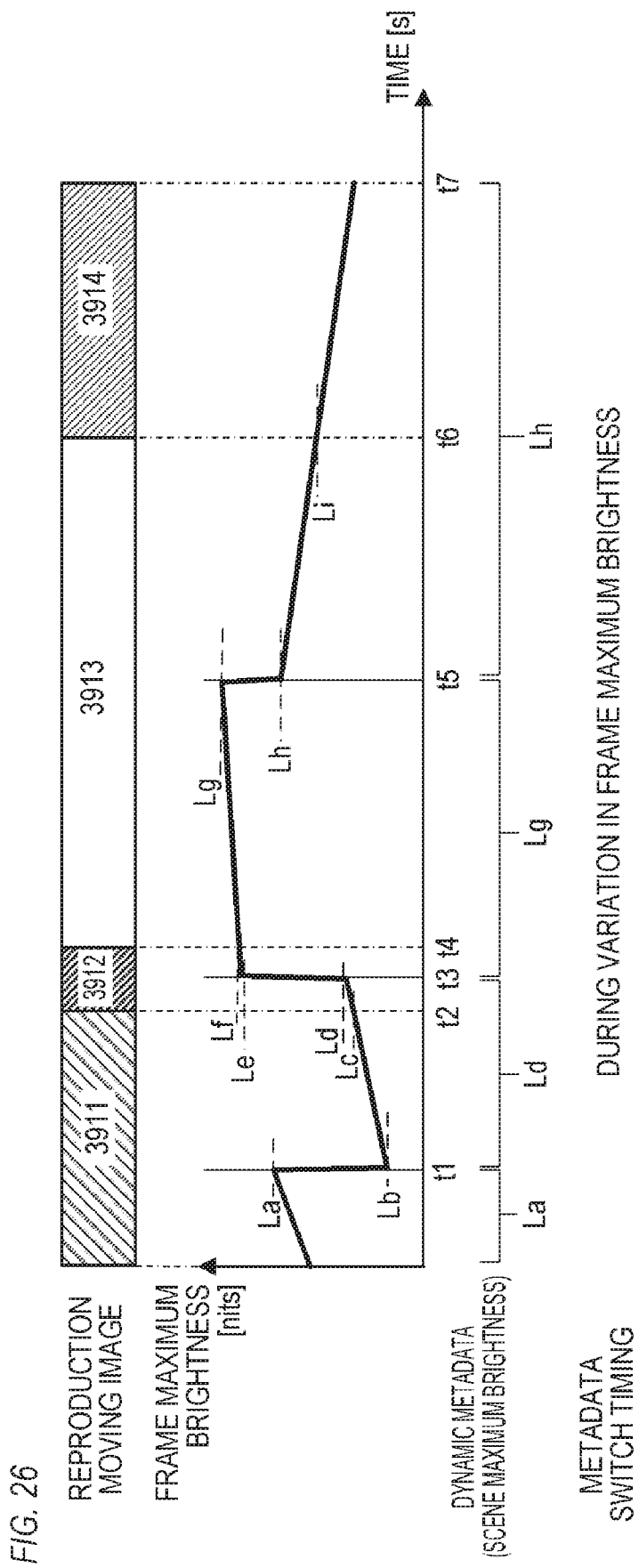
FIG. 26 is a schematic view showing an example of dynamic metadata according to the second embodiment.

FIG. 26 is a schematic view showing an example of regenerated dynamic metadata in a case where the time priority mode is set. In a similar manner to FIG. 24, the difference between the frame maximum brightness La and the frame maximum brightness Lb, the difference between the frame maximum brightness Ld and the frame maximum brightness Le, and the difference between the frame maximum brightness Lg and the frame maximum brightness Lh are equal to or larger than the threshold described earlier for detecting a scene change. A case where the time priority mode is set is a case where a moving image photographed in the variable frame rate photography mode is reproduced over a reproduction time that is equal to a photography time of the moving image.

When the time priority mode is set, the reproducing unit 3108 regenerates dynamic metadata in which a period corresponding to a characteristic amount changes at a timing where a scene of a moving image is changed independent of the photography frame rate. In this case, a timing where a scene of a moving image changes is not a timing where the photography frame rate has been changed but, for example, a timing where the frame maximum brightness varies by an amount equal to or larger than a threshold. In the present embodiment, when the time priority mode is set, a timing where the photography frame rate has been changed is not handled as a timing where a scene change occurs but a timing where the frame maximum brightness varies by an amount equal to or larger than a threshold is handled as a timing where a scene change occurs. In other words, dynamic metadata indicating a scene maximum brightness is regenerated by handling the reproduction moving images 3911 to 3914 as one reproduction moving image.

Specifically, a period from the time point 0 where reproduction is started to the time point t1 where the frame maximum brightness varies from the brightness La to the brightness Lb is detected as a period of one scene. In addition, as a part of dynamic metadata to be regenerated or, more specifically, metadata corresponding to the detected scene (the period from the time point 0 to the time point t1), metadata indicating the scene maximum brightness La of the scene is regenerated. In a similar manner, a period from the time point t1 to the time point t3 where the frame maximum brightness varies from the brightness Ld to the brightness Le is detected as one scene and metadata indicating a scene maximum brightness Ld of the scene is regenerated as metadata corresponding to the detected scene. A period from the time point t3 to the time point t5 where the frame maximum brightness varies from the brightness Lg to the brightness Lh is detected as one scene and metadata indicating a scene maximum brightness Lg of the scene is regenerated as metadata corresponding to the detected scene. In addition, a period from the time point t5 to the time point t7 where reproduction is ended is detected as one scene and metadata indicating a scene maximum brightness Lh of the scene is regenerated as metadata corresponding to the detected scene. In this manner, while metadata is changed at the time points t1, t3, and t5 where the frame maximum brightness varies by an amount equal to or larger than a threshold, metadata is not changed at the time points t2, t4, and t6 where the reproduction state varies.

By using dynamic metadata regenerated by the process described above, since a tone curve is not changed during reproduction of a scene of a moving image, a brightness variation attributable to a variation in the tone curve can be suppressed.

As described above, according to the present embodiment, dynamic metadata is regenerated by a method in accordance with a reproduction method of a moving image photographed in the variable frame rate photography mode. Accordingly, display at a suitable brightness can be realized using dynamic metadata suitable for a reproduction method.

According to the sixth and seventh embodiments, the following aspects (configurations) are disclosed.

First Aspect

An imaging apparatus comprising:

a setting unit configured to set a photography mode;

a generating unit configured to generate metadata indicating a characteristic amount of a captured moving image; and an adding unit configured to add the metadata generated by the generating unit to moving image data representing the moving image, wherein the generating unit generates the metadata indicating the characteristic amount of the moving image in a period corresponding to a photography mode set by the setting unit.

Second Aspect

The imaging apparatus according to the first aspect, wherein the characteristic amount is a maximum brightness.

Third Aspect

The imaging apparatus according to the first or second aspect, wherein in a case where the photography mode set by the setting unit is a photography mode in which a reproduction time of the moving image is shorter than a photography time of the moving image, the generating unit generates metadata indicating a characteristic amount of each frame of the moving image.

Fourth Aspect

The imaging apparatus according to any one of the first to third aspects, wherein in a case where the photography mode set by the setting unit is a photography mode in which a plurality of still images are sequentially photographed, the generating unit performs a process of generating metadata indicating a characteristic amount of a captured still image with respect to each of the plurality of still images that are sequentially photographed, and the adding unit performs a process of adding the metadata generated by the generating unit to still image data representing the still image corresponding to the metadata with respect to each of the plurality of still images that are sequentially photographed.

Fifth Aspect

The imaging apparatus according to any one of the first to fourth aspects, wherein in a case where the photography mode set by the setting unit is a photography mode in which a reproduction time of the moving image is longer than a photography time of the moving image, the generating unit generates metadata indicating a characteristic amount of the entire of the moving image.

Sixth Aspect

The imaging apparatus according to any one of the first to fifth aspects, wherein in a case where the photography mode set by the setting unit is a photography mode in which moving image data representing a moving image captured during a predetermined period is recorded linked with photography of a still image, the generating unit generates metadata indicating a characteristic amount of the entire of the moving image captured during the predetermined period.

Seventh Aspect

The imaging apparatus according to any one of the first to sixth aspects, wherein in a case where the photography mode set by the setting unit is a photography mode in which a photography frame rate can be changed, the generating unit generates metadata in which the period corresponding to the characteristic amount changes at a timing where the photography frame rate is changed.

Eighth Aspect

The imaging apparatus according to the seventh aspect, wherein in a case where the photography mode set by the setting unit is a photography mode in which a photography frame rate can be changed, the generating unit generates metadata indicating a characteristic amount of each frame of the moving image with respect to a period in which the photography frame rate is lower than a predetermined frame rate.

Ninth Aspect

The imaging apparatus according to the seventh or eighth aspect, wherein in a case where the photography mode set by the setting unit is a photography mode in which a photography frame rate can be changed, the generating unit generates metadata in which the period corresponding to the characteristic amount changes at a timing where a scene of the moving image changes during a period in which the photography frame rate is higher than a predetermined frame rate.

Tenth Aspect

The imaging apparatus according to the seventh or eighth aspect, wherein in a case where the photography mode set by the setting unit is a photography mode in which a photography frame rate can be changed, the generating unit generates metadata in which the period corresponding to the characteristic amount changes at a predetermined frame rate during a period in which the photography frame rate is higher than the predetermined frame rate.

Eleventh Aspect

The imaging apparatus according to any one of the first to tenth aspects, wherein in a case where a moving image photographed in a photography mode in which a photography frame rate can be changed is reproduced over a reproduction time that is equal to a photography time of the moving image, the generating unit regenerates metadata in which the period corresponding to the characteristic amount changes at a timing where a scene of the moving image is changed.

Twelfth Aspect

The imaging apparatus according to any one of the first to eleventh aspects, wherein in a case where a moving image photographed in a photography mode in which a photography frame rate can be changed is reproduced over a reproduction time that differs from a photography time of the moving image, the generating unit regenerates metadata such that, during a period in which the photography frame rate is a predetermined frame rate, the period corresponding to the characteristic amount changes at a timing where a scene of the moving image changes and at a timing where the photography frame rate is changed, and during a period in which the photography frame rate is not the predetermined frame rate, the period corresponding to the characteristic amount changes at a timing where the photography frame rate is changed.

It should be noted that each functional block according to the first to seventh embodiments may or may not be individual hardware. Functions of two or more functional blocks may be realized by common hardware. Each of a plurality of functions of a single functional block may be realized by individual hardware. Two or more functions of a single functional block may be realized by common hardware. In addition, each functional block may or may not be realized by hardware. For example, an apparatus may include a processor and a memory storing a control program. Furthermore, functions of at least a part of functional blocks included in the apparatus may be realized by having the processor read the control program from the memory and execute the control program.

It is to be understood that the first to seventh embodiments (as well the modifications described above) are merely examples and that configurations obtained by appropriately modifying or altering the configurations of the first to seventh embodiments without departing from the spirit and scope of the present invention are also included in the present invention. Configurations obtained by appropriately combining the configurations of the first to seventh embodiments are also included in the present invention.

According to the present disclosure, dynamic metadata and the like (a characteristic amount of each scene) can be generated without involving post-production.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-209754, filed on Nov. 7, 2018, Japanese Patent Application No. 2018-239362, filed on Dec. 21, 2018, and Japanese Patent Application No. 2019-033958, filed on Feb. 27, 2019, which are hereby incorporated by reference herein in their entirety.

What is claimed is:

1. An imaging apparatus comprising:
an image sensor configured to capture a moving image, and
at least one memory and at least one processor which function as:
a determining unit configured to determine a plurality of scenes of the moving image on a basis of a time variation of a parameter corresponding to a frame of the moving image;
an acquiring unit configured to acquire a characteristic amount of each of the plurality of scenes; and
a generating unit configured to generate information in which a characteristic amount acquired by the acquiring unit is associated with each of the plurality of scenes, wherein
there are a plurality of parameters corresponding to the frame, and
the determining unit determines the plurality of scenes using a parameter in accordance with a set photography mode among the plurality of parameters.

2. The imaging apparatus according to claim 1, wherein the characteristic amount includes a maximum brightness value of moving image data of a scene corresponding to the characteristic amount.

3. The imaging apparatus according to claim 1, wherein the parameter includes a maximum brightness value of image data of the frame.

4. The imaging apparatus according to claim 1, wherein the determining unit determines the plurality of scenes so that a scene change is not performed at a time position where the parameter does not vary, and a scene change is performed at a time position where the parameter varies.

5. The imaging apparatus according to claim 4, wherein the determining unit determines the plurality of scenes so that a scene change is not performed at a time position where the parameter varies by a variation amount that is smaller than a threshold, and a scene change is performed at a time position where the parameter varies by a variation amount that is larger than the threshold.

6. The imaging apparatus according to claim 1, wherein the parameter includes an imaging parameter when capturing an image of the frame.

7. The imaging apparatus according to claim 6, wherein the imaging parameter includes at least one of ISO sensitivity, a shutter speed, an aperture value, a focus position, a focal length, white balance, and an exposure value.

8. The imaging apparatus according to claim 6, wherein the imaging parameter includes at least one of an aperture value, a focus position, and a focal length.

9. The imaging apparatus according to claim 1, wherein in a case where an image of a frame includes an in-focus region and an out-of-focus region, the determining unit determines the plurality of scenes on a basis of the parameter corresponding to only the in-focus region among the in-focus region and the out-of-focus region.

10. The imaging apparatus according to claim 1, further comprising an output interface for connecting to an external apparatus, wherein
the at least one memory and the at least one processor further function as: an output control unit configured to perform control so as to output data of the moving image and the information in association with each other, and
the output control unit performs control so as to output the data of the moving image in a stream format from the output interface to the external apparatus.

11. The imaging apparatus according to claim 1, wherein the acquiring unit
acquires a maximum brightness value of image data corresponding to an in-focus region of an image of a frame with respect to each of a plurality of frames of the moving image, and
includes a maximum value of two or more maximum brightness values acquired with respect to a scene of the moving image in the characteristic amount of the scene.

12. The imaging apparatus according to claim 1, wherein the determining unit determines the plurality of scenes so that a scene change is not performed independent of a time variation of the parameter at a time position where an in-focus region of an image of the frame narrows.

13. The imaging apparatus according to claim 1, wherein the determining unit does not determine the plurality of scenes in a case where a specific photography mode is set.

14. The imaging apparatus according to claim 1, wherein the parameter includes an average value of a maximum brightness value of image data of a corresponding frame that is the frame corresponding to the parameter and a maximum brightness value of one or more frames that are time-sequential with respect to the corresponding frame.

15. The imaging apparatus according to claim 1, wherein the characteristic amount is dynamic metadata specified in SMPTE ST 2094.

16. A control method of an imaging apparatus, the control method comprising:
a capturing step of capturing a moving image;
a determining step of determining a plurality of scenes of the moving image on a basis of a time variation of a parameter corresponding to a frame of the moving image;
an acquiring step of acquiring a characteristic amount of each of the plurality of scenes; and
a generating step of generating information in which a characteristic amount acquired in the acquiring step is associated with each of the plurality of scenes, wherein
there are a plurality of parameters corresponding to the frame, and
in the determining step, the plurality of scenes is determined using a parameter in accordance with a set photography mode among the plurality of parameters.

17. A non-transitory computer readable medium that stores a program, wherein the program causes a computer to execute a control method of an imaging apparatus, the control method comprising:
a capturing step of capturing a moving image;

a determining step of determining a plurality of scenes of the moving image on a basis of a time variation of a parameter corresponding to a frame of the moving image;

an acquiring step of acquiring a characteristic amount of each of the plurality of scenes; and a generating step of generating information in which a characteristic amount acquired in the acquiring step is associated with each of the plurality of scenes, wherein there are a plurality of parameters corresponding to the frame, and in the determining step, the plurality of scenes is determined using a parameter in accordance with a set photography mode among the plurality of parameters.

* * * * *